United States Patent

[11] 3,590,151

[72] Inventor Arlie L. Keith
Rockledge, Fla.
[21] Appl. No. 687,029
[22] Filed Nov. 30, 1967
[45] Patented June 29, 1971
[73] Assignee Jackson & Church Electronics Company, Inc.
Satellite Beach, Fla.
Continuation-in-part of application Ser. No. 607,600, Dec. 30, 1966.

[54] TELEVISION SURVEILLANCE SYSTEM
32 Claims, 16 Drawing Figs.

[52] U.S. Cl. 178/6.8
[51] Int. Cl. H04n 7/02
[50] Field of Search 178/6, 6.8; 250/217, 221, 222; 356/158, 167

[56] References Cited

UNITED STATES PATENTS 2,493,843 1/1950 Merchant 178/6
2,561,197 7/1951 Goldsmith 178/6.8
3,114,797 12/1963 Williams 178/6.8
3,336,585 8/1967 Macovski 178/6

*Primary Examiner*—Robert L. Griffin
*Assistant Examiner*—Barry Leibowitz
*Attorney*—Woodhams, Blanchard & Flynn

ABSTRACT: A method and apparatus is disclosed by which surveillance may be maintained over a domain for detecting changes of interest in the domain and ignoring other changes. A parameter of the domain observed is scanned and sampled. The resulting sample data for individual sample points is digitized and used to update corresponding data averages over prior scans of the same sample points. Specified differences between the sample data and data average for a sample point result in modification of a suspicion value. Correlations in space and time of sample points having particular data changes further modifies the suspicion value. An output, such as an alarm, results from ultimate attainment of a predetermined suspicion value.

INVENTOR.
ARLIE L. KEITH
BY
Woodhams, Blanchard & Flynn
ATTORNEYS

INVENTOR.
ARLIE L. KEITH
BY
Woodhams, Blanchard & Flynn
ATTORNEYS

INVENTOR.
ARLIE L. KEITH
BY
Woodhams, Blanchard & Flynn
ATTORNEYS

INVENTOR.
ARLIE L. KEITH
BY
Woodhams, Blanchard & Flynn
ATTORNEYS

INVENTOR.
ARLIE L. KEITH
BY
Woodhams, Blanchard and Flynn
ATTORNEYS

INVENTOR.
ARLIE L. KEITH
BY
Woodhams, Blanchard & Flynn
ATTORNEYS

INVENTOR.
ARLIE L. KEITH
BY
Woodhams, Blanchard & Flynn
ATTORNEYS

INVENTOR.
ARLIE L. KEITH
BY
Woodhams, Blanchard & Flynn
ATTORNEYS

INVENTOR.
ARLIE L. KEITH
BY
Woodhams, Blanchard & Flynn
ATTORNEYS

INVENTOR.
ARLIE L. KEITH
BY
Woodhams, Blanchard & Flynn
ATTORNEYS

INVENTOR.
ARLIE L. KEITH
BY Woodhams, Blanchard & Flynn
ATTORNEYS

INVENTOR.
ARLIE L. KEITH
BY
Wordhams, Blanchard & Flynn
ATTORNEYS

INVENTOR.
ARLIE L. KEITH
BY
Woodhams, Blanchard & Flynn
ATTORNEYS

TELEVISION SURVEILLANCE SYSTEM

This application is a continuation-in-part of my copending application, Ser. No. 607,600, filed Dec. 30, 1966.

This invention relates to a method and apparatus for detecting changes in preselected parameters of a domain to be examined and more particularly relates to a method and apparatus for producing a sample signal representative of said parameters and for interpreting said sample signal to detect changes of interest in said parameters while ignoring changes not of interest, and which is capable of actuating an alarm when the changes are beyond acceptable limits.

The method and apparatus embodying the invention are here illustrated in a preferred form, more particularly, as a television motion detection surveillance system although it will be recognized that at least in its broader aspects the method and apparatus of the invention are readily adaptable to a number of other uses. It is particularly contemplated that the surveillance method and apparatus of the present invention at least broadly considered may be used for pattern comparison, for example, to detect incorrect labeling of bottles on a filling line, incorrect distribution geometry and density in a particle suspension, incomplete or incorrect assembly of a complex mechanical device on an assembly line or a variety of other such situations wherein it is desired that certain changes in the appearance of a viewed area or of a set of similar, sequentially presented articles be noted.

Although the present invention arose from a need for a change-detecting device and method having a strong capability for rejecting extraneous changes in a visible domain, it is contemplated that the invention in its broader aspects is applicable to other domains of continuous or quasi-continuous nature, i.e., domains capable of being scanned and sampled. Thus, the term "domain" in its broadest sense is applicable not only to a scene illuminated by visible light but to an area emanating electromagnetic radiation other than of visible light or to means radiating a sound spectrum. As an example, the latter domain might comprise sounds generated by a normally functioning piece of mechanical equipment in which changes indicating malfunction are to be detected.

The term "surveillance" as used in its broadest sense herein includes the concept of observation of the domain of interest for long continuous periods or short occasional periods and it is not intended that the term be limited to the sense of guarding a changeable domain, although the primary embodiment of the invention is particularly adapted to such use.

The embodiment of the invention shown is, however, particularly useful for maintaining surveillance over warehouses, storerooms, vaults, closed stores, other space areas, and other situations where human watchmen or sentinels have historically been used to detect trespassing persons or things or undesirable occurrences such as fire or the like.

As a result, the following discussion will, for convenience in illustration only, refer primarily to such use.

Despite the traditional importance there has been a recent tendency to replace or supplement human guards with mechanized devices and more usually with electronic devices including those with visual-sensing capabilities. In one known arrangement, one human guard is enabled to do the work of several by watching a television receiver connectable alternatively to a plurality of television cameras positioned to view areas or objects to be protected. In this arrangement, no area is continuously under surveillance which may allow an undesirable condition to escape detection or at least delay detection. Further, actual detection of a prowler or the like is still done by the human guard and thus depends on his sharpness of perception as well as his alertness and integrity.

A further known device provides a television screen fed from a television camera surveying the area to be protected in which a plurality of photocells are fixed in front of the television screen. A change in photocell output activates an alarm. Such a device, however, may be expected to have a number of disadvantages and may not be workable for many applications. More particularly, each photocell tends to detect the average light intensity of over a relatively large area of the television screen, generally corresponding in size to the photocell itself. Thus, changes in the image within that area would not be detected unless the average light intensity for the area changed. Thus, such systems have not generally had a high degree of discrimination.

Further, a relatively large range of light intensity change must be allowed for each photocell to prevent false alarms due to variations in the light input to the photocell caused by normal electrical and optical noise, e.g., noise from power line fluctuation, radiofrequency interference and a wide variety of other sources. Even when the sensitivity of such a system is set at a relatively low level it would be expected that a relatively high incidence of false alarms due to large amplitude, random noise might occur. Further, such a known system may be sensitive to false alarms resulting from natural optical phenomena such as the gradual darkening of a windowed room at dusk, shifting of shadows thrown by sunlit objects in the field of view.

As a result, it is an object of this invention to provide a method and apparatus for surveillance capable of maintaining surveillance over subject matter, noting changes thereon, reliably discriminating between meaningful and meaningless changes therein and causing an alarm to be actuated upon occurrence, or alternatively, upon nonoccurrence, of a meaningful change.

A further object is to provide a method and apparatus, as aforesaid, which does not utilize human perception or judgment to actuate an alarm in response to an undesired change in the subject matter.

A further object is to provide a method and apparatus, as aforesaid, in which the subject matter is a scene viewed, and in which the number of points changing in light intensity, the magnitude of intensity change and the distribution of the points in space and time are considered and compared to preselected limits to determine whether an alarm should be actuated.

A further object is to provide a method and an apparatus, as aforesaid, which is capable of detecting changes of light intensity within an extremely small portion of the total area of the scene viewed and which is therefore capable of very fine discrimination.

A further object is to provide a method and apparatus, as aforesaid, which can detect changes in light intensity at a large number of relatively close spaced points in the scene viewed.

A further object is to provide a method, as aforesaid, in which changes in the light intensity at a plurality of points in the scene is detected by an optical transducer and by a sequence of comparisons determining whether the changes are relevant, e.g., indicate the presence of prowler, the decision that the changes are relevant causing actuation of an alarm.

A further object of this invention is to provide an apparatus, as aforesaid, which includes an optical transducer arranged to view the area or object to be protected, means for sampling the output of the optical transducer, further means for determining whether changes in the sampled output represent an undesired trespassing person or thing and for actuating an alarm if required.

A further object is to provide apparatus, as aforesaid, which can maintain surveillance without human attention, which is capable of continuous and reliable operation over long periods of time without attention, which is highly resistent to emitting a false alarm and which is capable of giving an alarm when the optical transducer viewing the area or object to be protected is itself rendered inoperative by a trespasser.

A further object is to provide a method and apparatus, as aforesaid, which is immunized against normal electrical noise resulting from powerline fluctuations, radiofrequency interference and so forth.

A further object is to provide a method and apparatus, as aforesaid, which is generally immune to spurious optical phenomena or noise including periodically flashing lights, such as neon signs or the like or shadows which shift with the changing angle of the sun.

A further object is to provide an apparatus, as aforesaid, which is particularly adapted to be constructed for the most part from integrated circuits and which thereby can be made relatively compact and portable for improved flexibility of use and for relatively inexpensive production.

A further object is to provide a method and apparatus, as aforesaid, particularly capable of reliably detecting the movements of natural, human or mechanical phenomena or changes in arrangement of entities in a fixed scene despite high electrical and optical noise levels.

A further object is to provide a method and apparatus, as aforesaid, which is particularly adapted, though not limited, to use of a standard television camera as an optical transducer, coupled to means for sampling the output thereof, which at least in its broader aspects contemplates simultaneous scanning and sampling by use of an optical transducer including a matrix of many discreet, small light sensors or admitters corresponding in size, quantity and arrangement to the points to be sampled in the image of the scene viewed.

A further object is to provide a method and apparatus, as aforesaid, which in its preferred embodiment employs a television camera adaptable to a wide variety of divergent applications through use of different conventional television camera lenses including zoom lenses, wide angle lenses and the like, the method and apparatus being insensitive to distortions of the scene by the lens system employed.

A further object is to provide a method and apparatus, as aforesaid, which can be adapted to use with a television camera made to periodically shift position for reducing camera burn and/or for scanning a wider area.

A further object is to provide a method and apparatus, as aforesaid, adapted to use with a wide variety of optical transducers including, either without adjustment or with minor changes, color television cameras and cameras operating beyond the visible electromagnetic radiation spectrum such as infrared cameras, ultraviolet cameras and so forth.

A further object is to provide a method and apparatus, as aforesaid, which is capable of maintaining surveillance over several unrelated scenes by training a television camera on each such scene, in which the sampled image from several cameras can be simultaneously processed and in which the cameras may be remotely located to the remaining apparatus by cable, radio or other links.

A further object is to provide a method and apparatus, as aforesaid, which may use a television camera equipped with a microscope lens system for performing surveillance over biological cultures or other microscopic phenomena for actuating an alarm, photographing means or other devices upon a significant change in the pattern of the scene viewed, e.g., movement or division of cells in a cell culture.

A further object is to provide a method and apparatus, as aforesaid, which is adapted to emphasize the alarm-actuating effect of changes in a preferred area of the scene viewed.

A further object is to provide a method and apparatus, as aforesaid, particularly adapted to use as a pattern recognizer for simple, specially oriented patterns by comparing the pattern viewed with a desired pattern and actuating an alarm when the patterns do not coincide and, for example, could be used in fingerprint verification, bottle-labeling verification on a bottle-filling line or verification of correct assembly of complex mechanical devices such as automotive engines on an assembly line.

A further object is to provide a method and apparatus, as aforesaid, which is adjustable so as to consider a particular change in the field of view used as a significant alarm actuating change or as a nonsignificant change to be ignored depending upon the requirements of the situation in which the apparatus is to be used.

A further object is to provide a method and apparatus, as aforesaid, in which the domain is sampled and scanned and the products of such sampling are interpreted by accumulating such products and producing an output when the accumulated products are at a predetermined value.

A further object is to provide a method and apparatus, as aforesaid, in which changes in scanned and sampled points in the domain, reflecting preselected kinds of changes in the domain, when interpreted give rise to suspicion levels of an amount to actuate an alarm.

A further object is to provide a method and apparatus, as aforesaid, in which the values of sample derived from scanning a domain are compared to prior averages for the same sample points, the deviations in the sample data from the prior average being interpreted for determining whether an undesirable condition exists.

Further objects will be apparent to persons acquainted with methods and apparatus of this type upon reading the following description and inspecting the following drawings.

Figure 1:
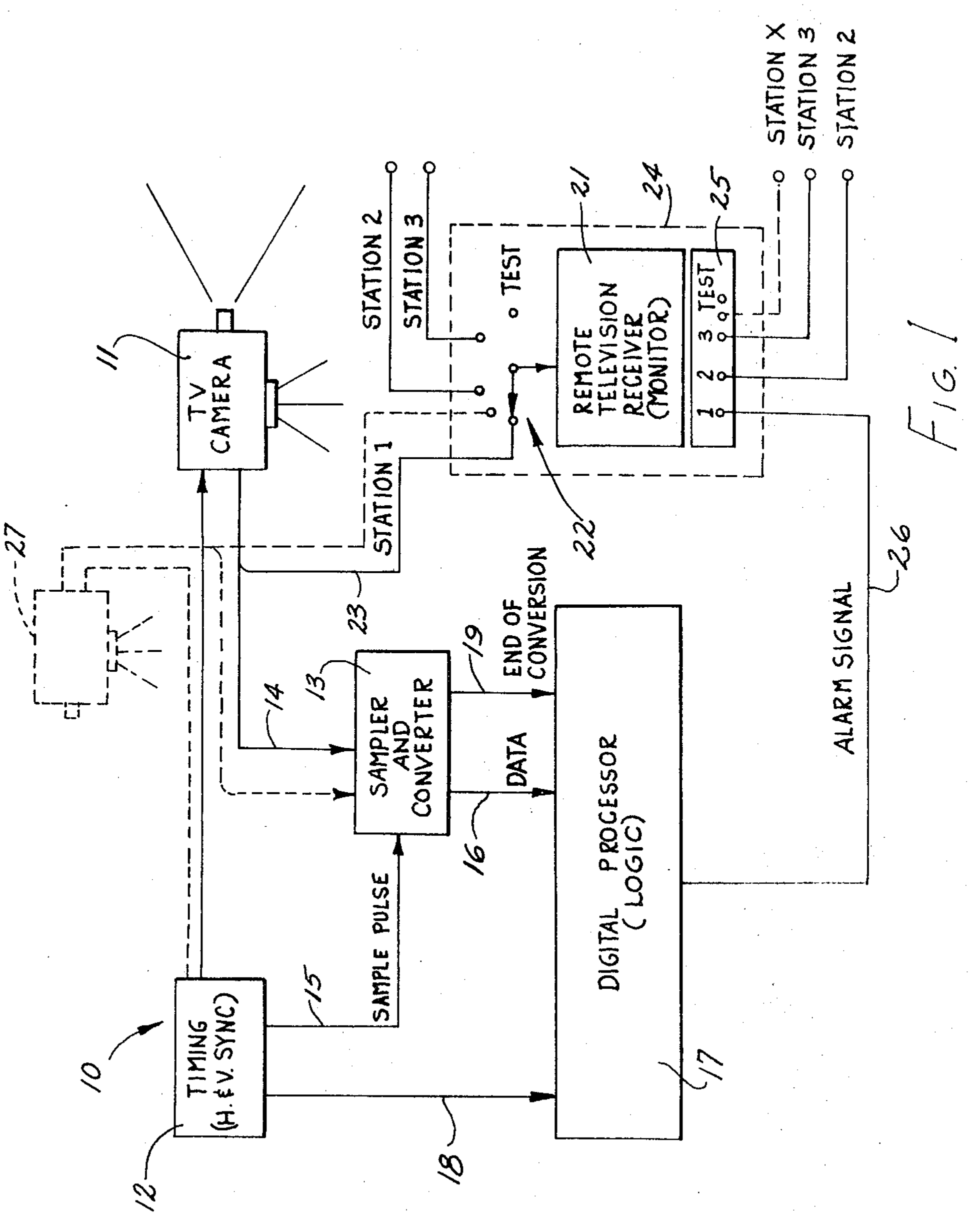
FIG. 1 is a block diagram of a surveillance system embodying the present invention.
Figure 3:
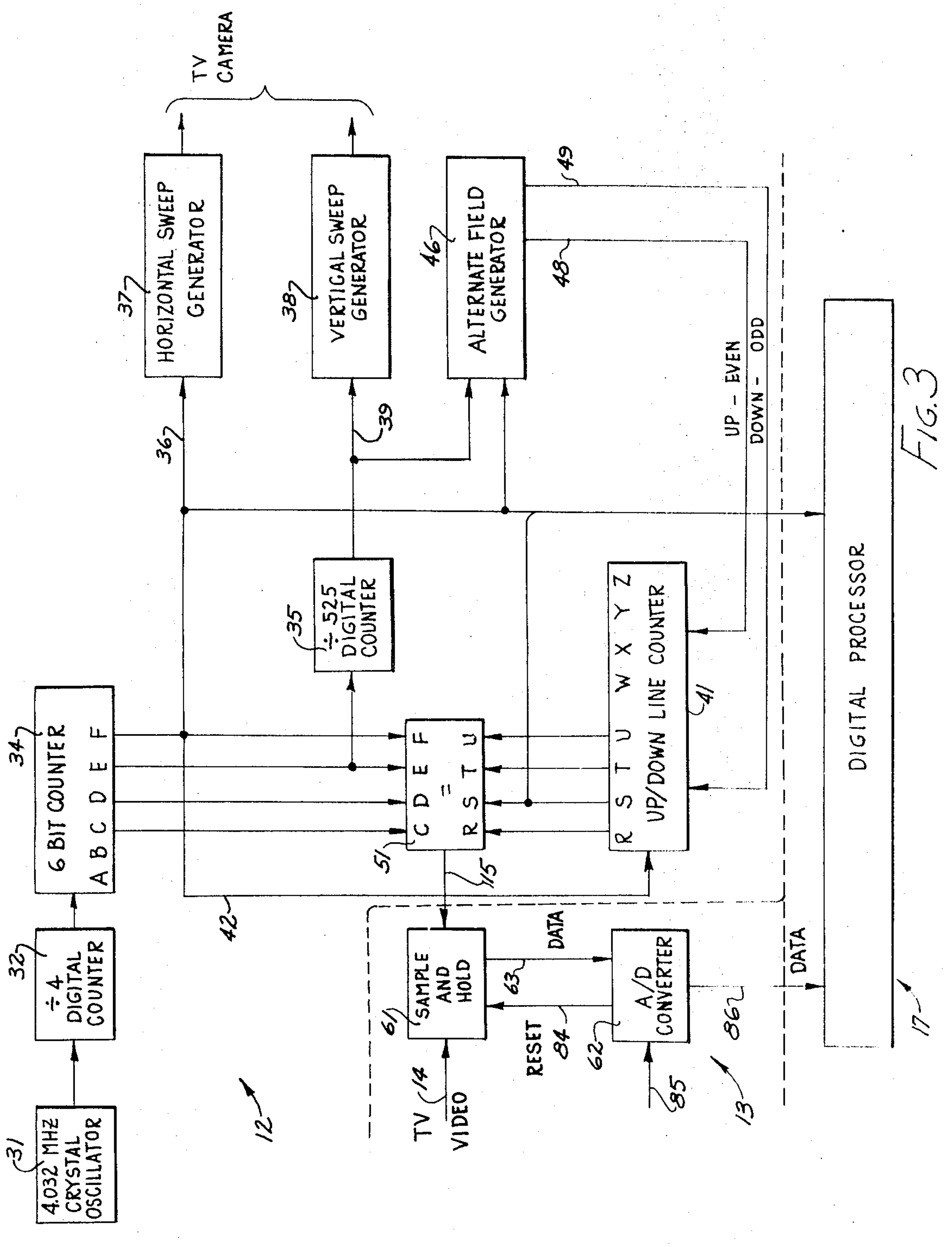

FIG. 3 schematically discloses a block diagram of the timing block of FIG. 1.

Figure 4:
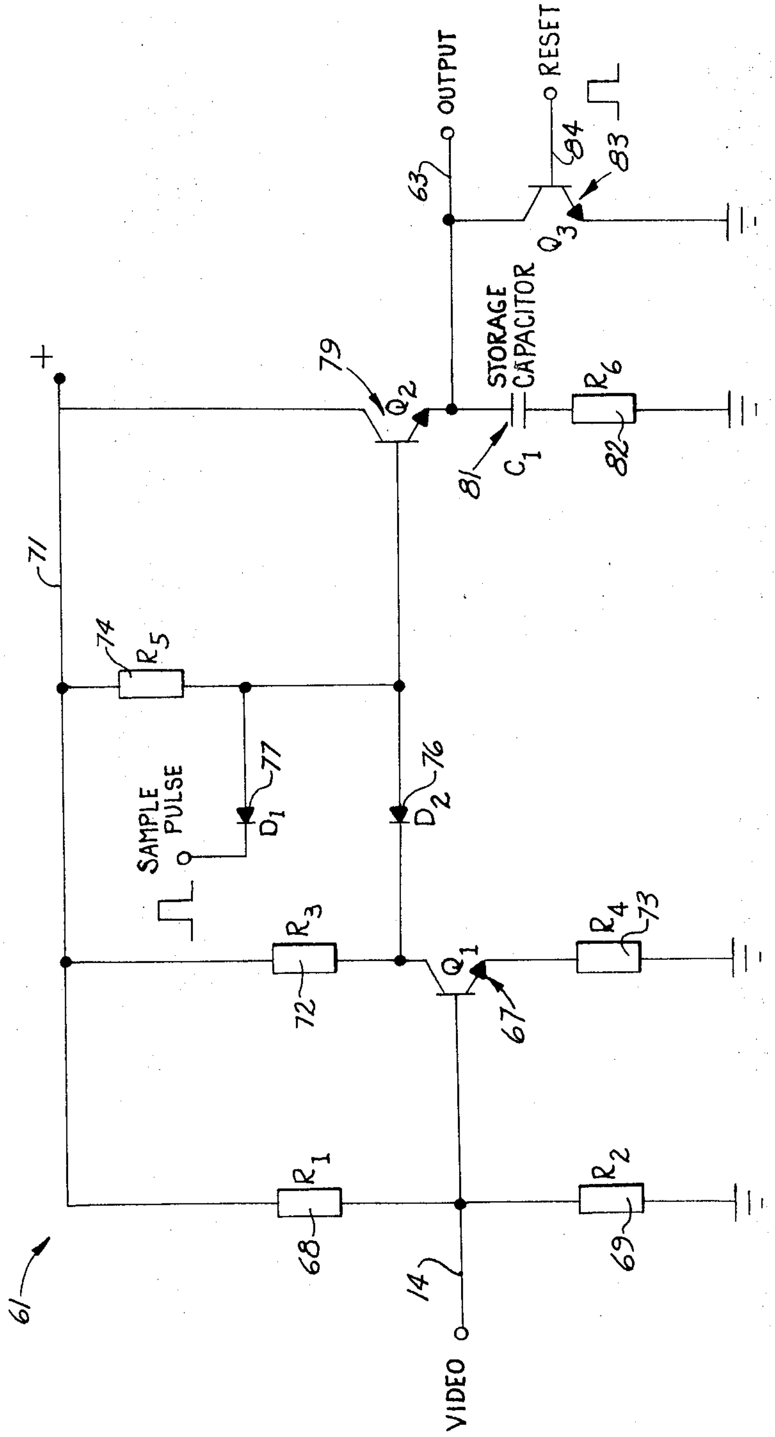

FIG. 4 is a schematic diagram of the sample and hold circuit of FIG. 3.

Figure 5:
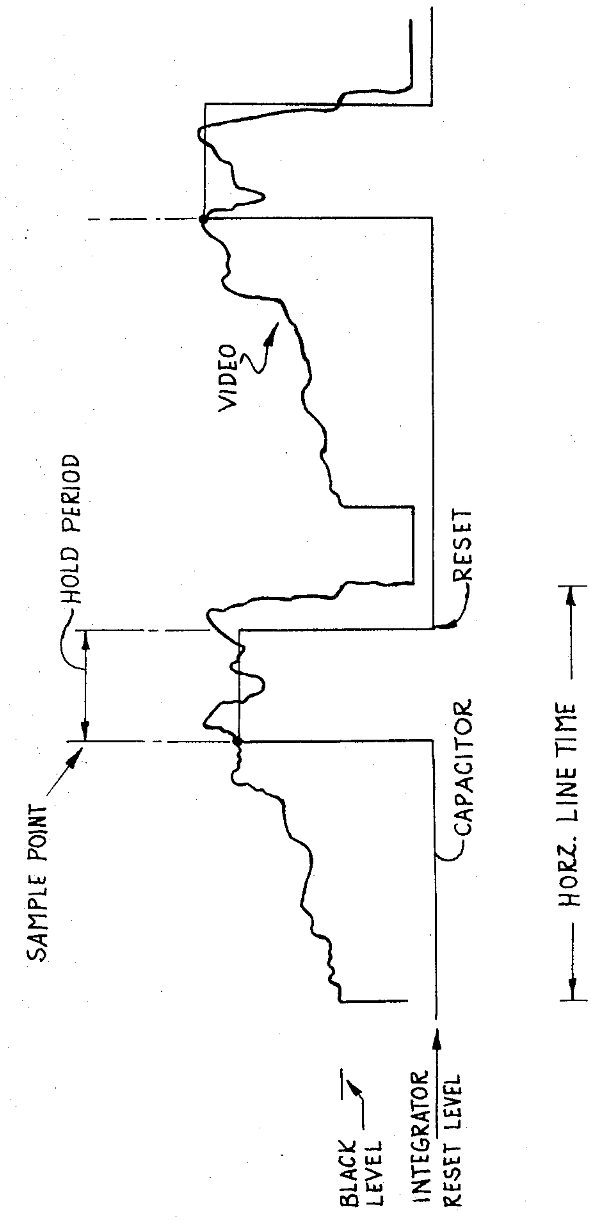

FIG. 5 discloses a typical video waveform output as obtained from the television camera of FIG. 1 and illustrates the sampling pattern used.

Figure 6:
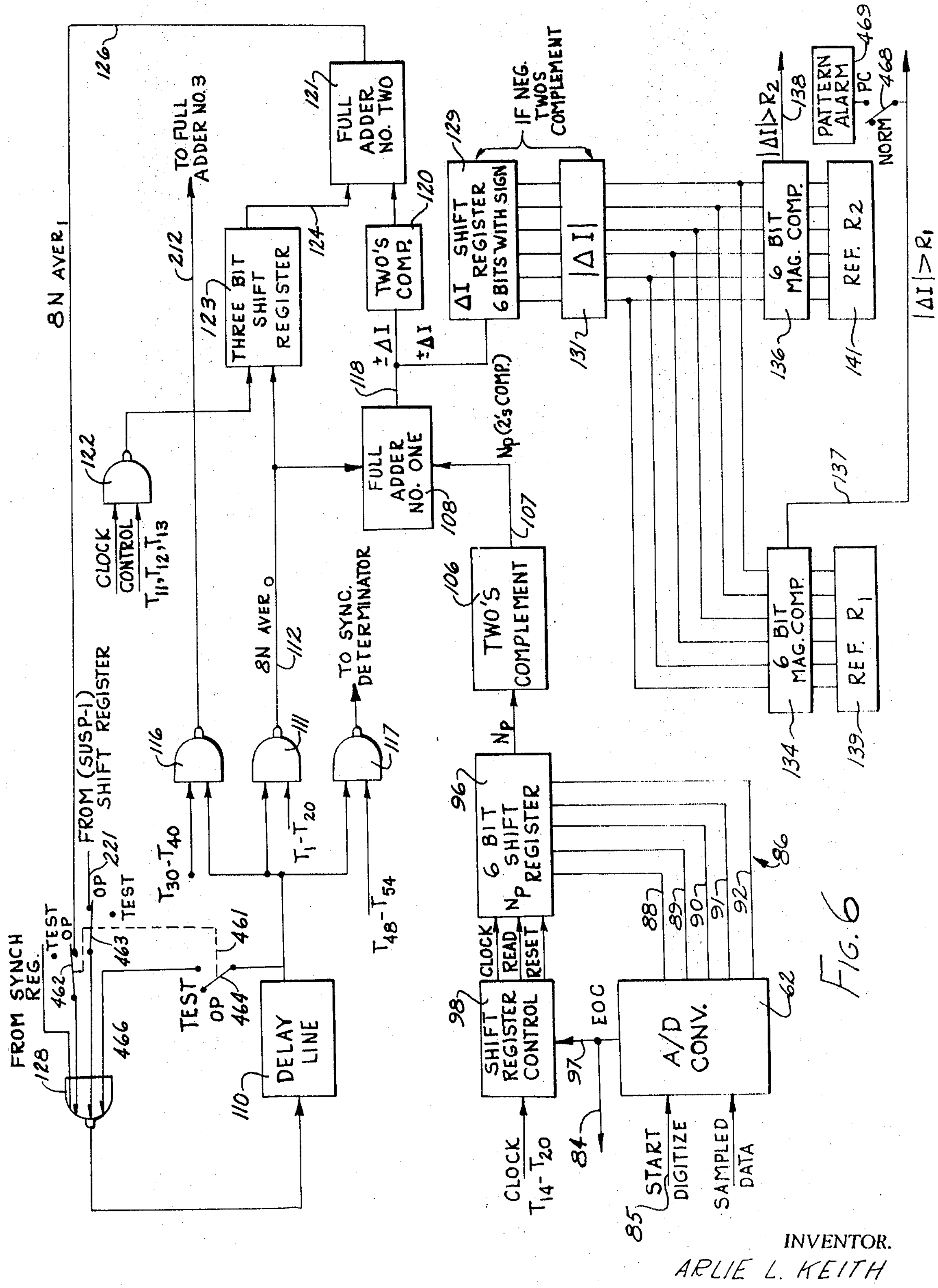

FIG. 6 is a block diagram disclosing the data-averaging and comparator logic portion of the digital processor shown in FIGS. 1 and 3.

Figure 7:
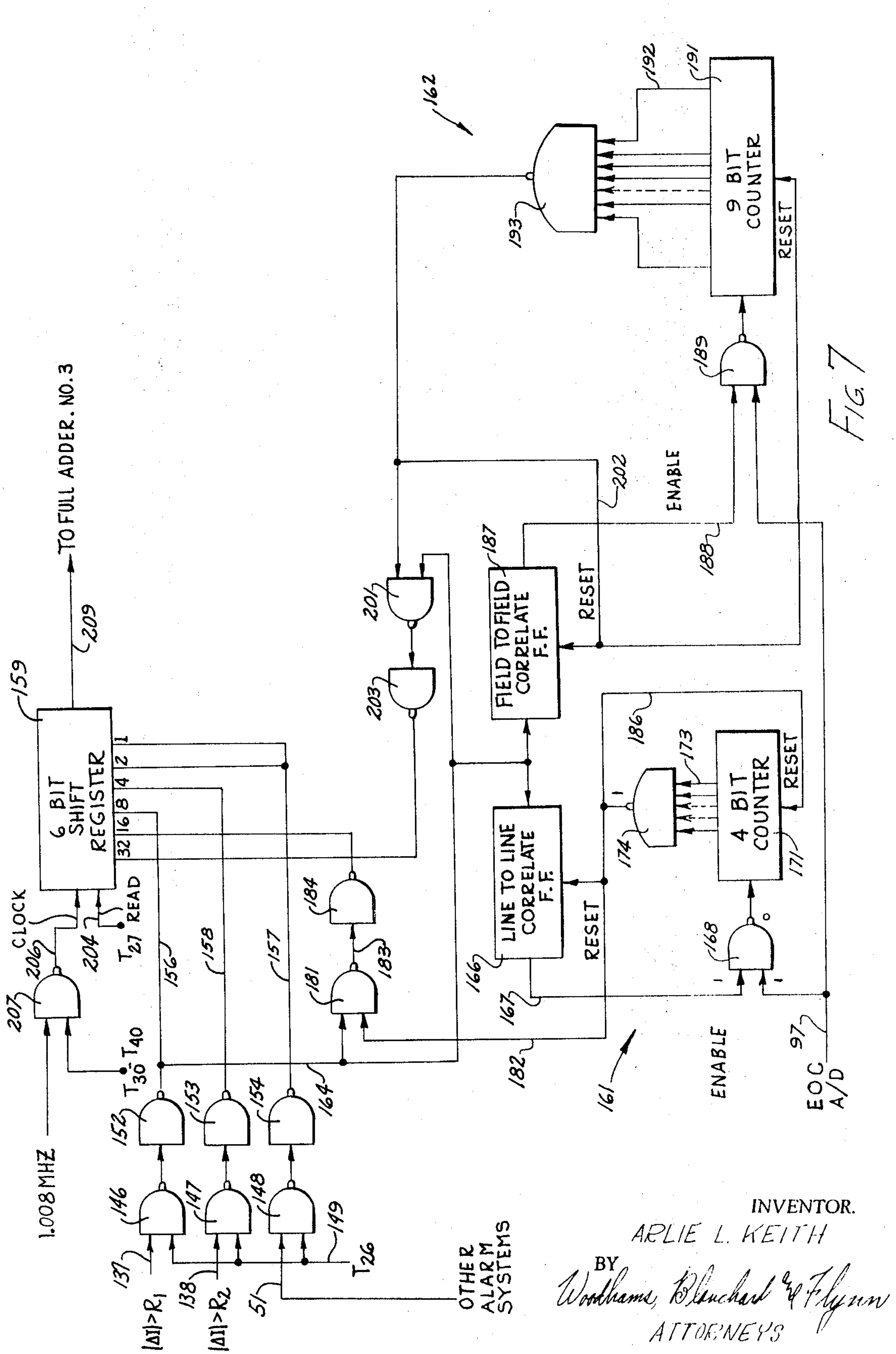

FIG. 7 is a schematic diagram showing the suspicion register input logic portion of the digital processor of FIGS. 1 and 3.

Figure 8:
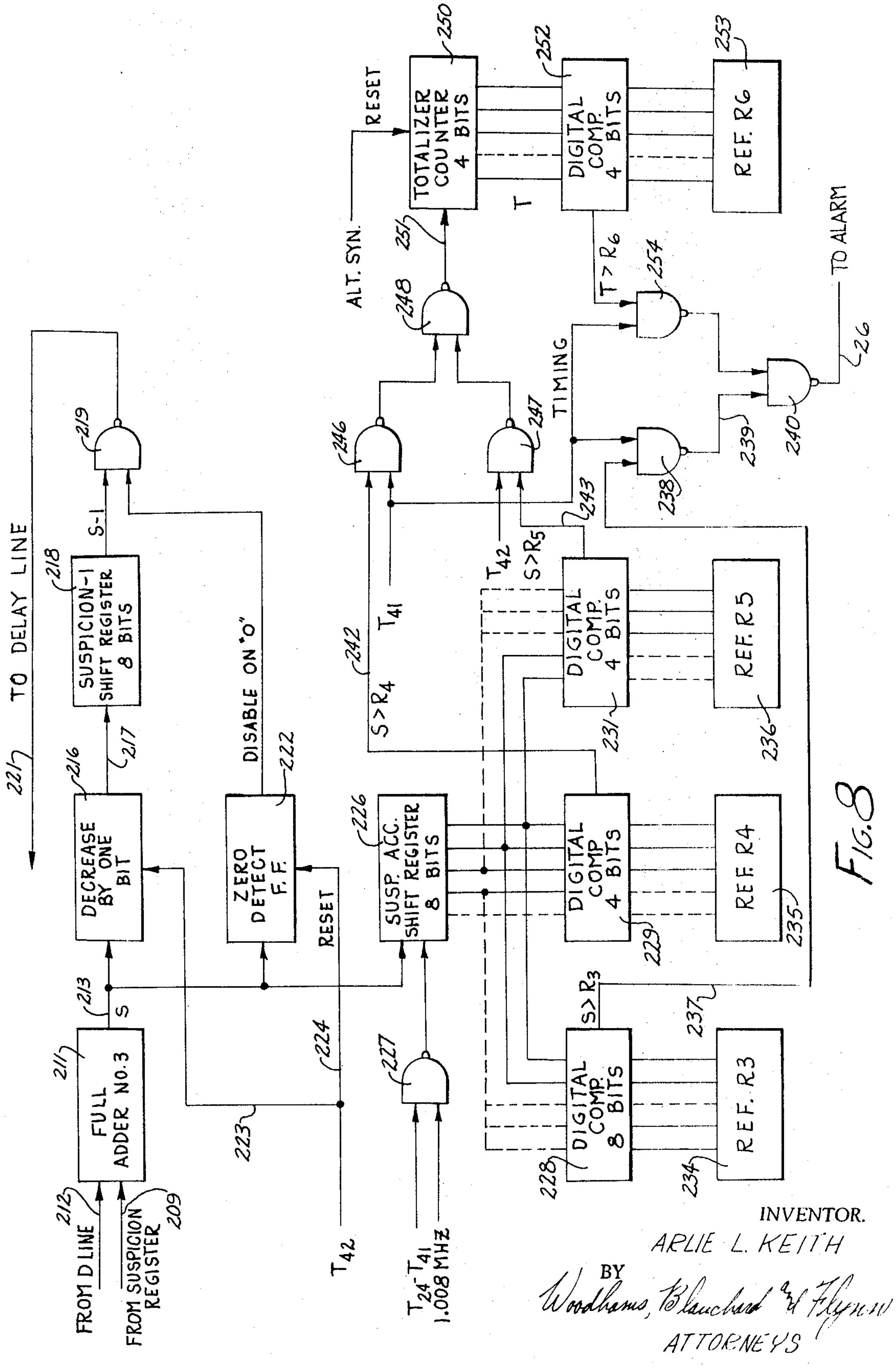

FIG. 8 illustrates the suspicion storage, detection and alarm logic portion of the digital processor of FIGS. 1 and 3.

Figure 9:
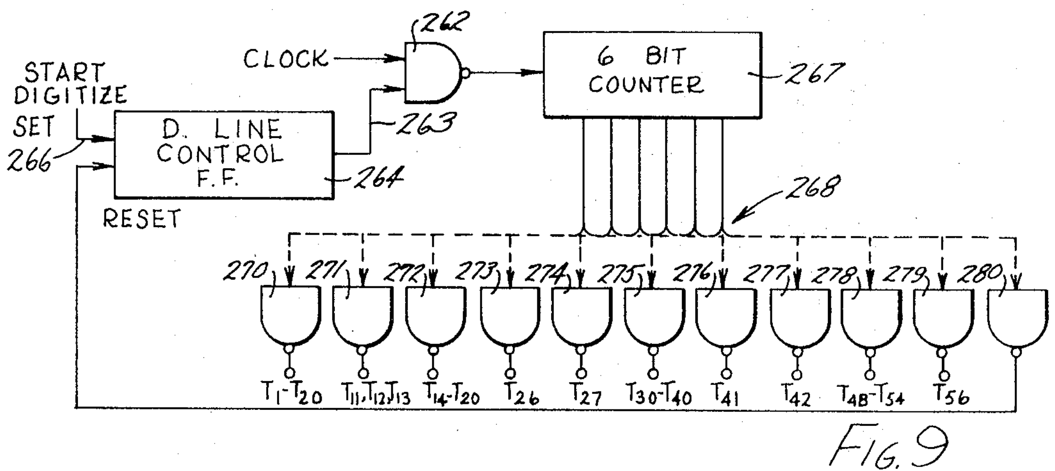

FIG. 9 is a schematic diagram showing a timing circuit used in the digital processor of FIGS. 1 and 3.

Figure 10:
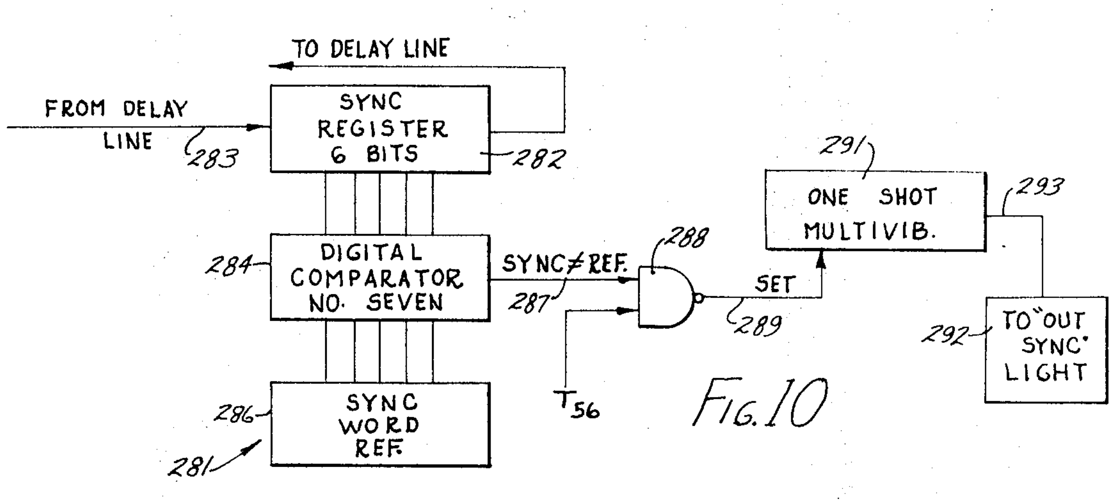

FIG. 10 is a memory-synchronizing circuit used in the digital processor of FIGS. 1 and 3.

Figure 11:
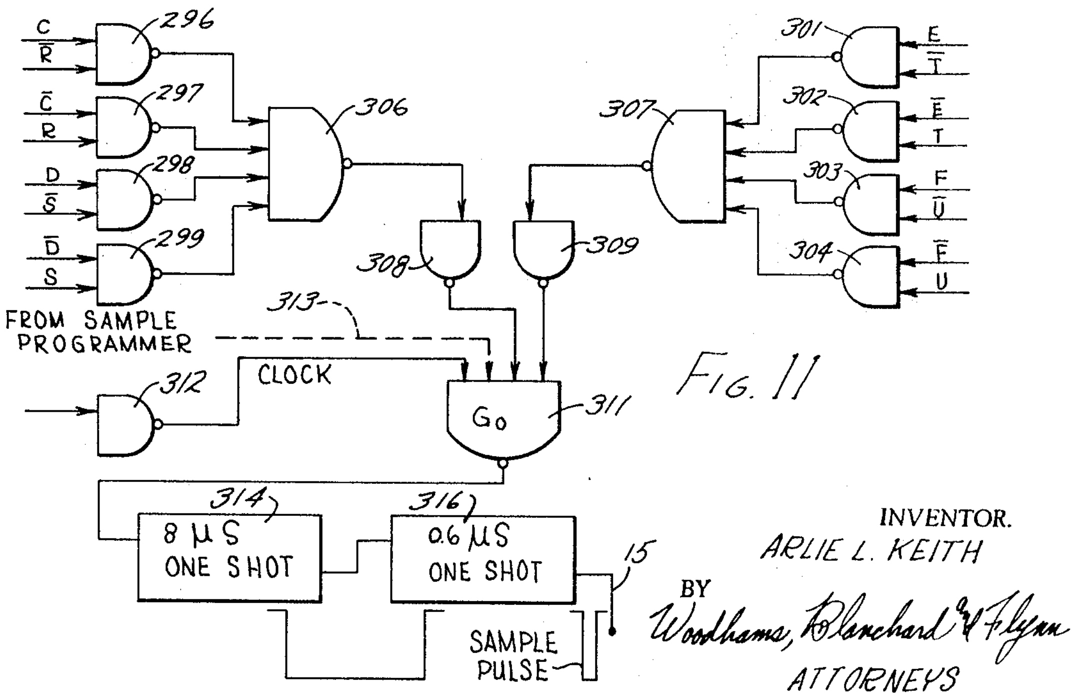

FIG. 11 is a schematic diagram of the CDEF=RSTU logic used in the circuit of FIG. 3.

Figure 12:
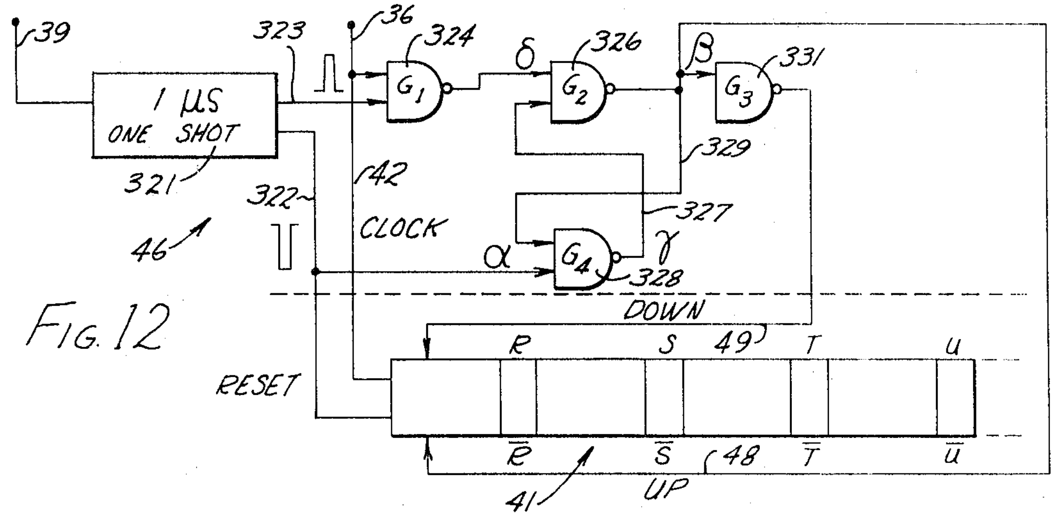

FIG. 12 is a schematic diagram of the alternate field generator of FIG. 3.

Figure 13:
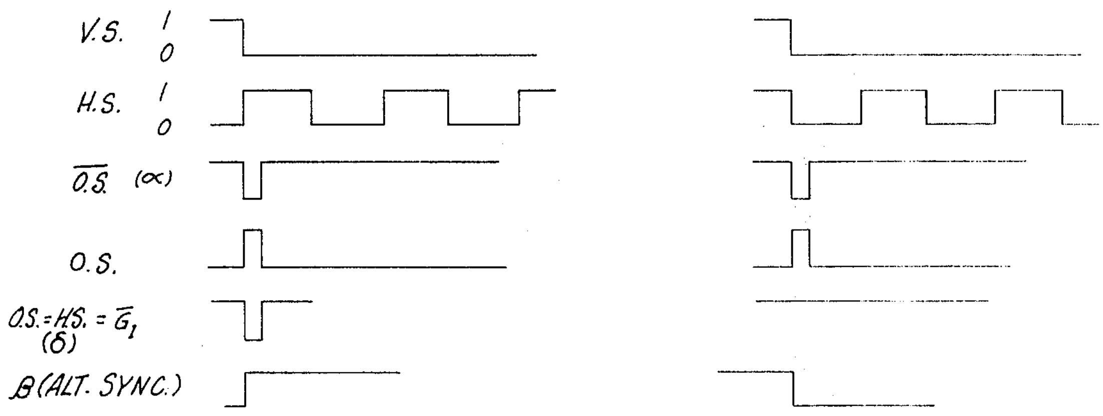

FIG. 13 is a waveform diagram illustrating waveforms of the circuit of FIG. 12.

Figure 14:
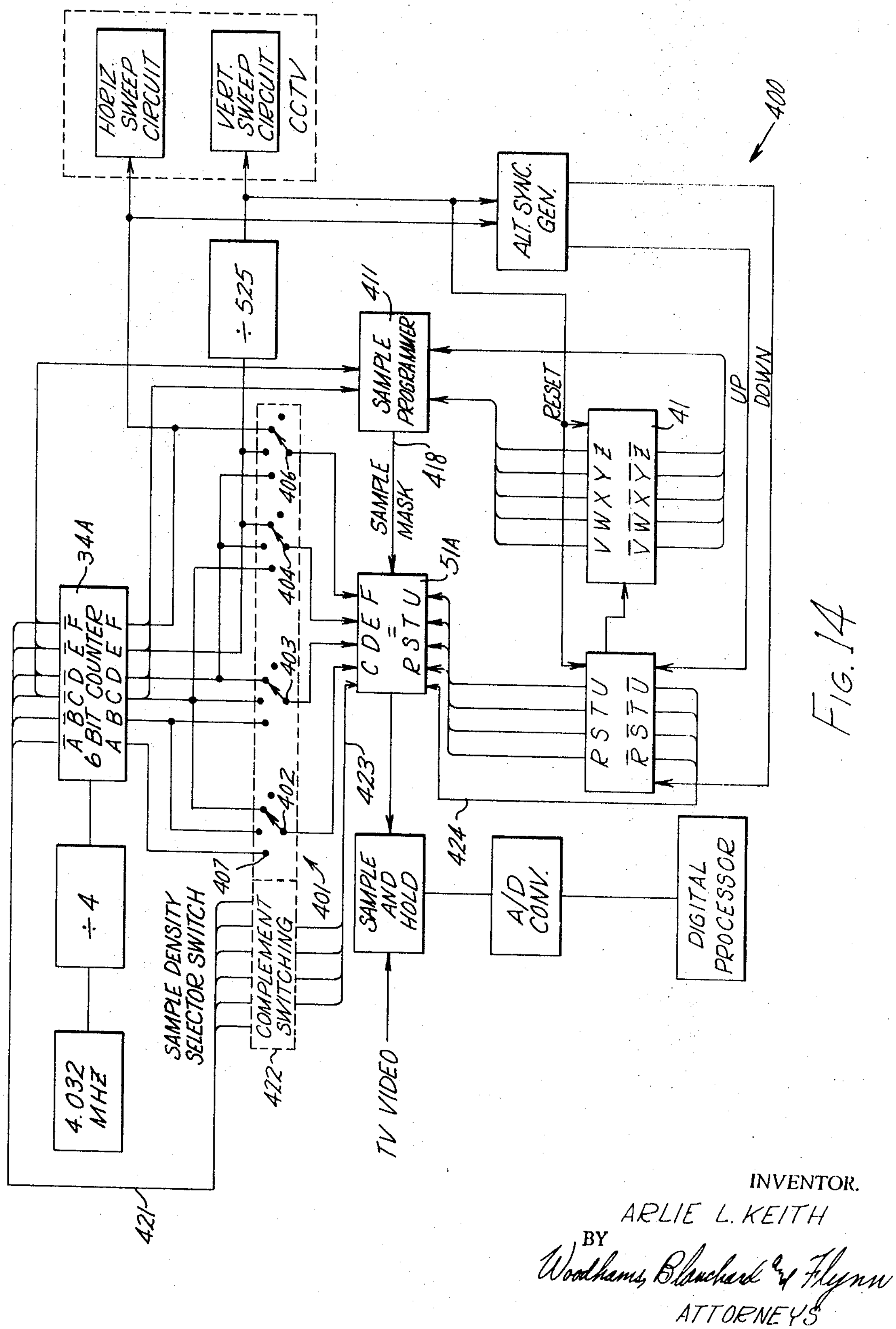

FIG. 14 is a modification of FIG. 3.

Figure 15:
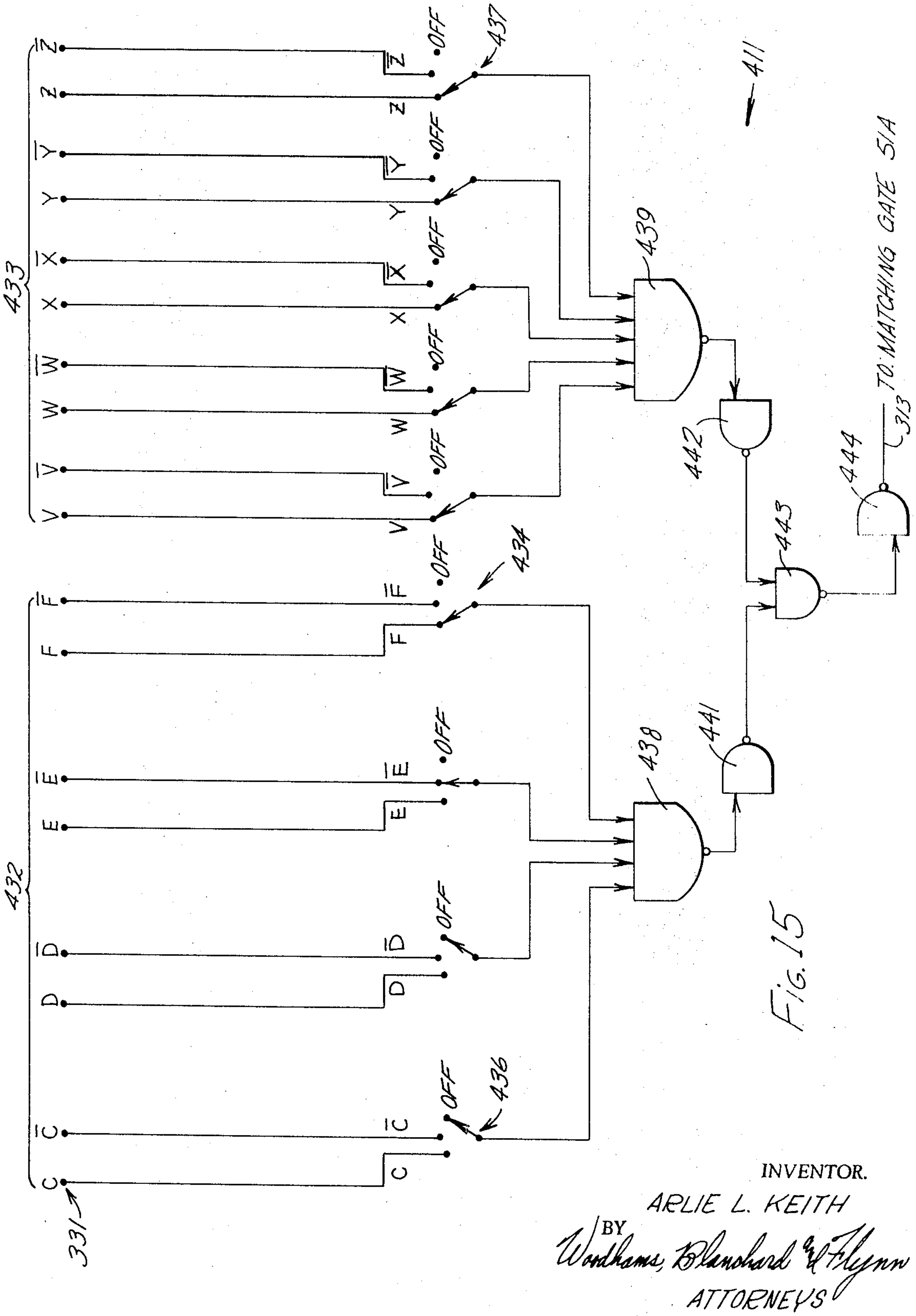

FIG. 15 is a schematic diagram of the sample programmer of FIG. 14.

Figure 16:
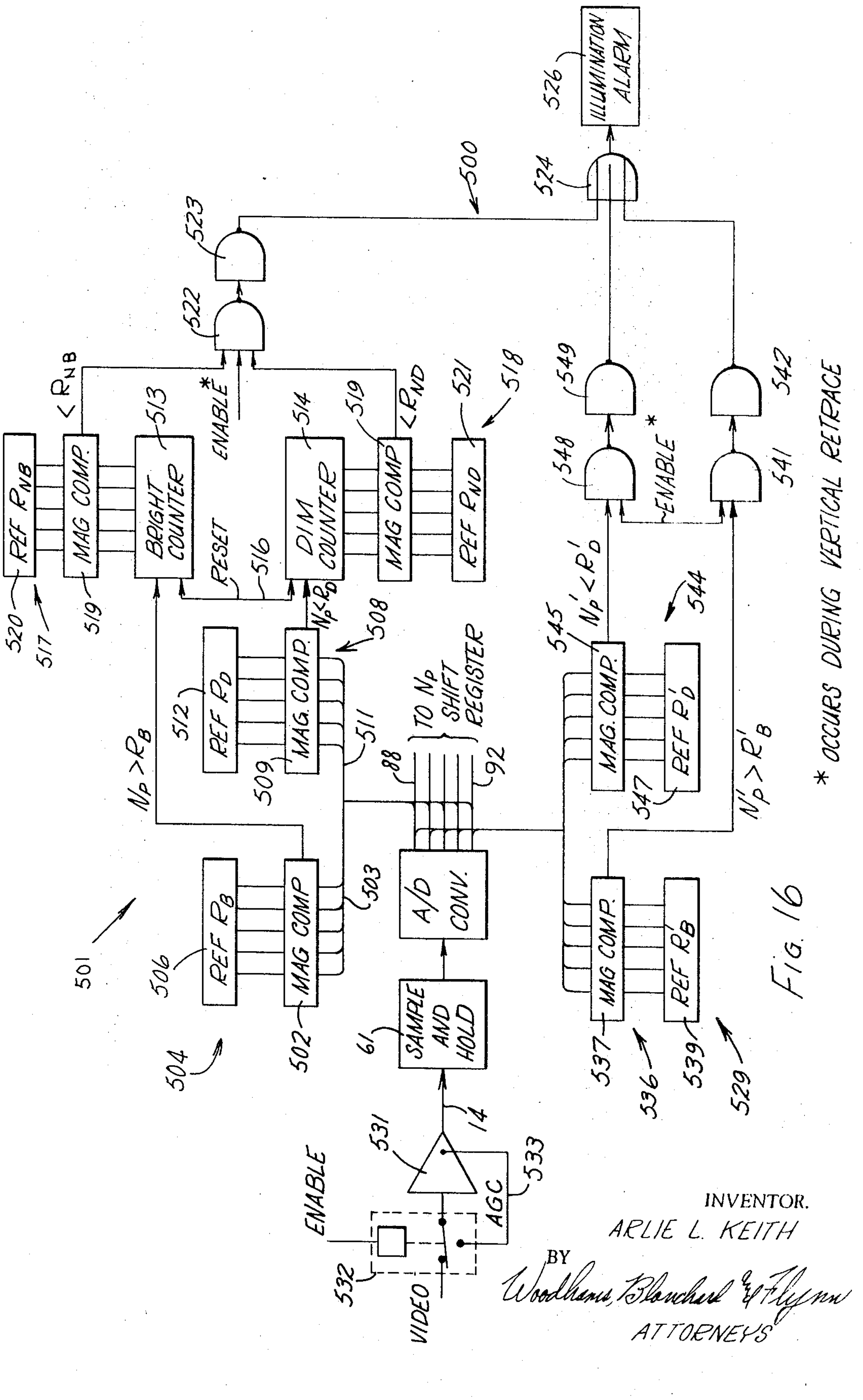

FIG. 16 is a schematic diagram of an illumination detection circuit used with the system of FIG. 1.

Certain terminology will be used in the following description for convenience and reference only and will not be limiting. The words "upwardly," "downwardly," "rightwardly" and "leftwardly" will refer to directions in drawings specifically referred to. Such terminology will include the words above specifically mentioned, derivatives thereof and words of similar import.

GENERAL DESCRIPTION

In general, the objects and purposes of this invention are met by providing a method for detecting changes in a viewed scene which include scanning the scene with a suitable electro-optical transducer, preferably a television camera, in a manner to provide an electrical signal whose amplitude is related to the instantaneous light level in the scene along the path of scan. A sampling of points distributed over the scene and located along the path of scan is chosen. The instantaneous signal amplitudes corresponding to the sample points are digitized and the digitized value $N_p$ for each sample point is compared to an average of digitized values for the same point for previous frames. Digitized signals representing levels of suspicion are assigned to each sample point whose digitized light value $N_p$ is changed excessively from the previous average for that point. For such a changed point, the digitized light value $N_p$ is compared to corresponding values N for points adjacent thereto and subsequently scanned in the same and subsequent fields of scan to determine whether the disturbance in the scene extends beyond the sample point at which an excessive change in light level was first noted. Further suspicion levels are assigned when the subsequently scanned points deviate appreciably in digitized light value $N_p$ from the prior average $N_{aver_0}$ for such points. Deviations occurring in clusters in the scene raise the suspicion level to a point where an alarm is actuated.

The apparatus embodying the invention includes scanning means such as a television camera or any corresponding device capable of line scanning a scene or domain and developing an electrical signal of waveform related to the instantaneous light intensity at the corresponding points or segments on the line of scan. Sampling circuitry is provided for sampling the electrical waveform to produce sample signals and the sampled amplitudes are digitized so as to provide a digital representation of the light intensity at selected points in the scene. Averaging circuitry is provided which averages the digitized values for each point over several fields of scan to produce comparison standards, compares the resulting comparison standard (the average value $N_{aver_0}$) for each sample point to the corresponding new digitized value $N_p$ occurring in a new field of scan and provides a digitized signal $|\Delta I|$ related to the difference therebetween. Comparator circuitry compares the difference $|\Delta I|$ to preselected levels and as a result of exceeding one or more of such levels suspicion signals are fed to a suspicion register. The suspicion register takes on a digitized suspicion level when so actuated. Correlation circuitry causes the suspicion level recorded in the suspicion register to rise in response to the occurrence of excessive values of $|\Delta I|$ for sample points adjacent to and scanned subsequently to the sample point in question.

The resulting suspicion level is fed to an adding device along with a reduced suspicion level for the same sample point from the previous field of scan and the sum is compared to further reference levels which if exceeded result in actuation of an alarm.

DETAILED DESCRIPTION

FIG. 1 discloses apparatus 10 embodying the present invention. The apparatus 10 includes an electro-optical sensor 11 of any convenient type capable of scanning a scene over which surveillance is to be maintained, providing an electrical output proportional in amplitude to the instantaneous light intensity at successive points along the path of scan and scanning the scene in a series of lines spaced across said scene. The electro-optical sensor 11 is, in the preferred embodiment shown, a television camera in which the scene viewed appears as an image in the cathode-ray tube thereof and is scanned by a scanning electron beam to produce a video output signal in a known manner. Although the television camera 11 will normally be sensitized to visible light, it is contemplated that with suitable electro-optical means 11, scenes illuminated by electromagnetic radiation out of the visible frequency range such as infrared, ultraviolet or higher or lower frequency radiation, may be viewed.

It is further contemplated that in the broader aspects of the invention that the sensor 11 may be any device capable of periodically scanning a continuum of interest, e.g., sweeping a band of frequencies to inspect spaced points thereon.

The apparatus 10 further includes a timing circuit 12 which provides the proper synchronizing signals for the television camera 11. The video output of the television camera 11 is impressed on a line 14 which feeds a sampler and converter circuit 13. The timing circuit 12 also provides a series of sample pulses on the line 15 to the sample and converter circuit 13 to allow same to sample the video signal on line 14. The sampler and converter 13 then converts the amplitude of the sampled video signal portions, corresponding to points on the path of scan of the television camera, to digital signals, here binary coded, and impresses same through line 16 on a digital processor circuit 17. The digital processor 17 also receives timing pulses from the timing circuit 12 through a line 18. End of analog-to-digital conversion of the video portion associated with each sample point scanned is signalled by a pulse impressed by the sampler and converter 13 through a line 19 on the digital processor 17.

The digital processor 17 hereinafter described is arranged to ignore deviations in one or two video amplitudes of a given sample point which are the result of electrical or optical noise but to respond to significant changes in light intensity at each sample point as would result, for example, from intrusion of a trespasser into or removal of a part from the scene viewed by the television camera, by causing an alarm signal to be applied to an output line 26.

The apparatus 10 further includes a remote television receiver 21 carried in a monitor console 24 and fed through a selector switch 22 and line 23 alternatively from the television 11 associated with one station of surveillance and, if desired, corresponding television cameras at other stations, here stations 2 and 3. Thus, an operator may alternatively view the scenes scanned by each camera. The alarm signal line 26 from the digital processor 17 at station 1 is connected to an alarm 25 on the monitor console 24, for warning the operator whenever the processor 17 decides that an undesirable change has taken place in the scene viewed by the television camera 11. The alarm 25 may be of any convenient type such as an audible or visible alarm. Thus, upon receiving an alarm, the operator may through the switch 22 select the proper camera 11 and manually view the scene which caused the alarm to be sounded to determine if action should be taken.

It is further contemplated that the timing circuit 12, sampler and converter 13 and digital processor 17 associated with the camera 11 may also be used on a time-sharing basis with additional cameras, one of which is indicated in broken lines at 27, as discussed hereinafter. Such extra cameras are preferably connected to feed additional contacts on the selector switch 22 so that the operator could view the scene covered thereby.

The timing circuit (FIG. 3) includes a crystal oscillator 31. In the particular embodiment shown, the crystal oscillator produces a pulsed output at a frequency of 4.032 mHz. Such output is applied to a "divide by 4" digital counter 32 which in turn produces a 1.008 mHz. pulsed signal. A 6-bit counter 34 is fed by the counter 32 and has outputs A, B, C, D, E and F which appear pulsed outputs at one-half, one-fourth, one-eighth, etc., of the 1.008 mHz. input, respectively. A line 36 connects the output F, here providing a 15,750 Hz. pulse train, to the input of a conventional horizontal sweep generator 47 for operating the horizontal scan of the television camera 11 at that frequency. The output E of the 6-bit counter 34 connects through a "divide by 525" digital counter 35 which reduces the 31,500 Hz. pulsed signal on output E to 60 Hz. and feeds same through line 39 to the input of a conventional vertical sweep generator 38 for the television camera 11. It will be apparent that the frequencies of the oscillator 31 and the counters 32, 34 and 35 have been chosen to provide convenient and desired frequencies to the horizontal and vertical sweep generators and that the particular values chosen are standard in American television systems. It is contemplated, however, that the sweep frequencies applying and the oscillator and counter frequencies may be changed, as for example, to adapt the unit to use with European systems utilizing different sweep frequencies.

The timing circuitry 12 further includes an up-down line counter 41 having outputs R, S, T, U, W, Y and Z. A line 42 connected to the output F of the 6-digit counter 34 carries a pulsed signal of frequency identical to that fed to the horizontal sweep generator to the up-down line counter 41, for causing same to count once for every horizontal line scan of the television camera 11.

The timing circuitry further includes an alternate field generator 46 having inputs from lines 36 and 39 at the frequencies of the horizontal and vertical sweeps and providing outputs through lines 48 and 49 to the up-down line counter 41, a pulse on the line 48 indicating that the line counter will advance or count up and a pulse on the line 49 causing the line counter to reduce its count. Thus, for one field, the line counter counts up and for the next field it counts down. Each frame of the television camera thus comprises an "upcounted" field and "downcounted" field with reference to the line counter 41.

The timer 12 further includes a matching gate 51 which has inputs C, D, E and F on one side thereof connected to the outputs C, D, E and F of the 6-bit counter 34. Further inputs R, S, T and U on the other side of the counter 51 are connected to the outputs R, S, T and U of the up-down line counter 41. A preferred embodiment of the matching gate 51 is shown in FIG. 11 and discussed hereinafter. When the condition of inputs C, D, E and F is equal to the condition of the inputs R, S, T and U, respectively, the gate 51 provides a sample pulse on an output line 15 thereof. Since the up-down line counter 41 adds one count (or subtracts one count if on the alternate field) for every horizontal line swept by the television camera, as does the output terminal F of the 6-bit counter 34, it will be apparent that the counter inputs C, D, E and F each advance 16 times as rapidly as the corresponding R, S, T and U counter-inputs, so that the counter-inputs C, D, E and F will equal inputs R, S, T and U once every 16 scan lines and that there will be 16 different combinations of C, D, E and F which will be equal to combinations of R, S, T and U. As a result, there will be one sample pulse on output line 15 for each horizontal line scan. This sample pulse will occur one-sixteenth of a scan line later for each successive line swept and the pattern of occurrence of a sample pulse at a given horizontal point on a scan line will repeat every 16 scan lines.

Figure 2:
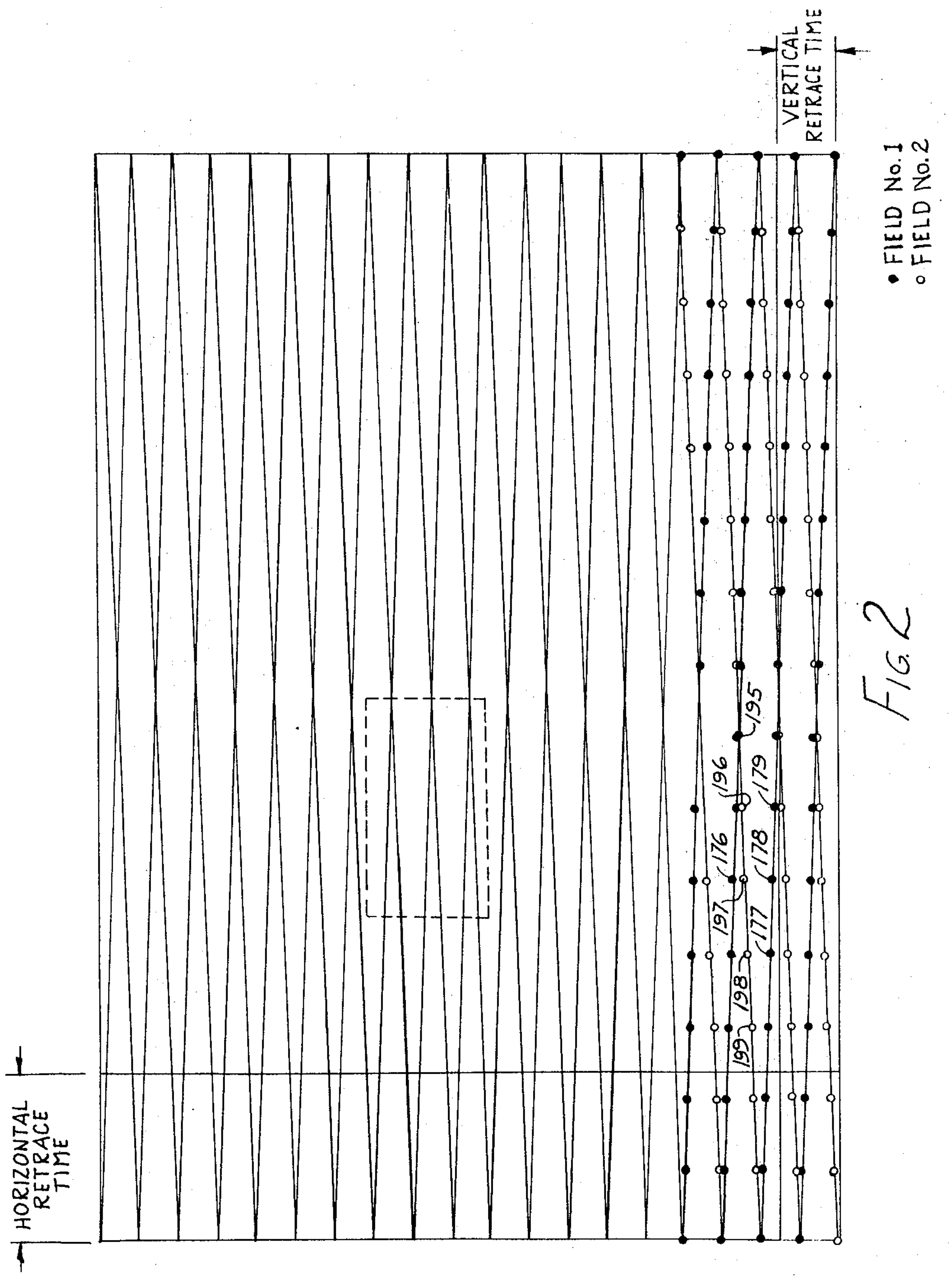
FIG. 2 is a diagram illustrating the location of sample points on the field of scan.

The resulting pattern of sample points is shown in FIG. 2. For a frame in which the up-down line counter 41 is counting up, the locus of sample points (black dots in FIG. 2) slopes downwardly and toward the right. On the next field, the counter 41 reverses and the locus of sample points (indicated by the open dots in FIG. 2) slopes downwardly from right to left crossing sample point loci on the first field. The sample points shown in FIG. 2 represent the points at which the scanning beam of the camera 11 is aimed when a sample pulse appears on line 15 and, hence, the points in the scene viewed by the camera whose light intensity is to be monitored.

Note in FIG. 2 that sample points can and do occur during the horizontal sweep retrace time which provides an excellent source of calibration for the system.

By changing the connection of the upper inputs (marked C, D, E and F) of the gate 51 to the 6-bit counter 34 the density of the sample points in the field swept corresponding to currents of sample pulses can be changed. This will be discussed in detail hereinafter but several different ones of a large number of possible combinations are shown, for example, in table I below which indicates that the number of points per horizontal scan line may be changed, the number of horizontal scan lines required for a repetition of the sample point pattern may be changed and in consequence the density of sample points in the field may be changed.

TABLE I.—SAMPLER LOGIC

| | | | |
|---|---|---|---|
| A, B, C, D | = | R, S, T, U | Four samples/line—repeats every 16 lines—1 μs horizontal spacing. |
| B, C, D, E | = | R, S, T, U | Two samples/line—repeats every 16 lines—2 μs horizontal spacing. |
| C, D, E, F | = | R, S, T, U | One sample/line—repeats every 16 lines—4 μs horizontal spacing. |
| D, E | = | R, S | Two samples/line—repeats every 4 lines—8 μs horizontal spacing. |

On the other hand, the connection of the R, S, T, U side of the matching counter 51 to the up-down line counter 41 can be changed to select only a portion of the field swept for which sample pulses are produced and, hence, to monitor light intensity at sample points in only a preselected portion of the scene viewed, as hereinafter described with respect to FIGS. 14 and 15.

The crystal oscillator 31 and the counters 32, 34, 35 and 41 may be of any desired and conventional construction. More specifically, the counters 32 and 34 are available as off-the-shelf items from a variety of sources, one example being the Engineered Electronics Company of Santa Ana, Calif. The counters 35 and 41 are conventionally constructed of several off-the-shelf counting modules and are not believed to require further description. The detailed circuitry of the matching gate 51 in conjunction with the counters 34 and 41 will be reviewed in more detail hereinafter. The alternate field generator 46 will be also reviewed in detail hereinafter.

Turning now to the sample and converter circuit 13, same includes a sample and hold circuit 61 which has an input from the television camera video output line 14 and from the sample pulse line 15. The sample and hold circuit 61 has an output 63 which is fed to an analog-to-digital converter 62. The sample and hold circuit samples the television signal whenever a sample pulse appears on the line 15 and applies the instantaneous amplitude of said video signal, occurring in coincidence with a sample pulse, to the A/D converter 62. The sample and hold circuit 61 is shown in detail in FIG. 4. The A/D converter 62 is of conventional construction, a preferred example being available from the Electronic Engineering Company of Santa Ana.

The sample and hold circuit 61 (FIG. 4) comprises a resistive voltage divider 68 and 69 connected between a positive potential line 71 and ground, the video input line 14 being connected intermediate the ends of the voltage divider 68 and 69 and to the base of a transistor 67. The collector and emitter terminals of the transistor 67 connect intermediate the ends of a resistance voltage divider 72 and 73 connected between the positive potential line 71 and ground. A series resistance 74 and diode 76 connects between the positive potential line 71 and the collector of transistor 67. The cathode of diode 76 is oriented toward the collector of transistor 67. The diode 77 has its anode connected to resistance 74 and its cathode connected to the sample pulse line 15 above described. A further transistor 79 has its collector connected to the positive potential line 71 and its emitter connected through a storage capacitor 81 and series resistance 82 to ground. The base of transistor 79 is connected by the junction of the resistance 74 and diode 76. Output is taken from the emitter of transistor 79 and applied through line 63 to the A/D converter 62. In addition, a reset transistor 83 connects at its collector to the output line 63 and at its emitter to ground, the base thereof being connected through a reset line 84 to the A/D converter 62.

Briefly considering the operation of the sample and hold circuit 61, application of the video signal through the line 14 to the base of the transistor 67 causes same to become conductive and as a result causes an inverted video signal waveform to appear on the collector thereof. Normally there is no sample pulse on the line 15 and the potential thereof is at a low level. In consequence, there is conduction through resistance 74 and diode 77 to the line 15 which holds the anode of diode 76 at a low potential and effectively blocks conduction through such diode 76. In consequence, the inverted and positive swinging video signal appearing at the collector of transistor 67 cannot be applied to the base of transistor 79. On the other hand, when a sample pulse appears on the line 15, the potential on the cathode of diode 77 rises, the diode 77 is thus blocked and no conduction occurs therethrough. As a result, the potential on the anode of the diode 76 rises and conduction therethrough and through the transistor 67 occurs thereby allowing the collector voltage of transistor 67 to be applied to the base of transistor 79. Upon conduction through the diode 76, the transistor 79 conducts through the storage capacitor 81 thus charging same to the instantaneous value of the video waveform during the time at which the sample pulse is applied to line 15. The sample pulse is relatively short, e.g., 1 $\mu$ sec. and as a result the sample taken of the video wave for amplitude is in effect an instantaneous value. The video amplitude value stored on capacitor 81 is applied to the A/D converter and is maintained until the A/D converter has completed its analog-to-digital conversion of the amplitude value stored, whereupon the A/D converter sends back a reset pulse on line 84 turning on transistor 83 for discharging the storage capacitor 81. The sample and hold circuit 61 is then ready for the next sample pulse.

The operation of the sample and hold circuit 61 is really seen in FIG. 5 which shows the video waveform as well as the waveform occurring on the capacitor 81.

A further line 85 applies a suitable "start digitize" signal to the A/D converter 62 preferably from the sample pulse line 15. The A/D converter provides a pulsed output which represents the numerical value in binary code of the instantaneous video amplitude, and hence light intensity, at a given sample point in the field of scan. The digital output of the A/D converter is fed through a path 86 to the processor 17. Turning now to the digital processor 17 in more detail, FIG. 6 discloses the data-averaging and comparison logic circuitry of the processor. The A/D converter here applies a 5-bit digital representation $N_p$ of the "just-sampled" illumination intensity level in parallel into an $N_p$ shift register through lines 88—92 of a path 86. The number of bits used in the illumination intensity representation $N_p$, here five bits, may be varied as desired, with corresponding changes in the bit capacity of succeeding equipment.

The 5-bit digital representation of the illumination intensity value $N_p$ has been found to be a good compromise for providing adequate accuracy and precision in defining the light level at a sample point without being overly demanding of computation time, memory capacity and computational equipment capacity. Thus, when the various portions of the apparatus hereinafter described including the aforementioned shift register 96 are described in terms of a given bit capacity, it will be understood that such values have been found to work well in practice but that it is contemplated that other bit capacities may be used as desired and that particular bit capacities are stated here merely for convenience in reference and for the sake of example.

The A/D converter provides an end of conversion (EOC) signal after it has completed its conversion, which is applied as the reset signal to the sample and hold circuit 61 as above described. The EOC signal is also applied through a line 97 to a shift register control circuit 98. An appropriately timed pulse $T_{14}$—$T_{20}$ from computer timing logic of FIG. 9 is applied to the shift register control 98 along with clock pulses at 1.008 mHz. from counter 32. When actuated by the end of conversion signal on the line 97, the control 98 applies said clock pulses for the period $T_{14}$—$T_{20}$ to the 6-bit shift register 96 and causes same to serially shift the 6-bit $N_p$ value applied thereto directly into a "two's complement" circuit 106. The two's complement circuit 106 is used to render the always positive value $N_p$ negative for purposes appearing hereinafter. The circuit 106 takes the two's complement of the intensity value $N_p$ for each succeeding sample point and applies the result, $N_p$ (two's comp.), through a line 107 to a first full adder circuit 108.

The data-averaging and comparison logic circuit of FIG. 6 further includes a memory 110. Although an addressable memory may be used, in the particular preferred embodiment shown, a serial memory is employed. Although other types of serial memories, i.e., magnetic drum memories, are known and may be employed, a delay line is here used for purposes of illustration. The length of the delay line 110 is preferably equal to the time required for the television camera to sweep out two fields, that is, one frame. Such a delay line can thus be synchronized with the cycling of the television camera and needs no addressing circuitry.

The delay line 110 may be considered to have a plurality of storage sections which advance with time in sequence therethrough, each such section corresponding to and holding data associated with a given sample point, the data for successively swept sample points lying in successive advancing delay line sections.

One portion of the section associated with each sample point stores a digital representation corresponding as hereinafter described to an average $N_{aver_0}$ over a plurality of prior frames of the digitized light intensity $N_p$ for that sample point. A further part of the delay line section contains a digital representation, usually several bits of a fractional portion of the aforementioned average $N_{aver_0}$, $k$ bits being employed to represent the fractional value, $2^k$ being the number of frames over which the average $N_{aver_0}$ is said to be taken.

Finally, the aforementioned section of the delay line provides a portion assigned to suspicion count bits which is be to described in more detail hereinafter.

The output of the delay line 110 is applied through a NAND gate 111 to a line 112 in serial on appearance of a timing pulse $T_1$—$T_{20}$ from the computer timing logic of FIG. 9. The first nine bits in the section of the delay line corresponding to a given sample point are a sign bit and eight bits, the approximate sum of the digitized intensity values N for the same sample point for previous fields, here for eight previous frames, and this quantity then is defined to be 8 times the average value of N for the last eight frames, i.e., 8 $N_{aver_0}$. Since the quantities $N_{aver_0}$ and 8 $N_{aver_0}$ are in binary form, the former can be obtained from the latter by shifting the binary point three places to the left. In the time $T_1$—$T_{20}$ only the first nine bits representing the value 8 $N_{aver_0}$ for the given sample point flow out of the memory 110.

A further NAND gate 116 connects to the output of the delay line 110 and is opened by a pulse from the timing logic of FIG. 9 for the time $T_{30}$—$T_{40}$ to press a further collection of bits from the delay line 110 associated with the given sample point on a third adder circuit indicated in FIG. 7 and hereinafter discussed.

A still further NAND gate 117 has an input from the delay line 110 and is opened at a still later time by a timing pulse $T_{48}$—$T_{54}$ from the computer-timing logic of FIG. 9 to provide a still further collection of bits associated with the sample point to a synch circuit shown in FIG. 10, and hereinafter discussed.

Referring again to the 9-bit output appearing serially on line 112 (8 $N_{aver_0}$), same is applied to the first full adder 108, the least significant three bits of the 9-bit 8 $N_{aver_0}$ code passing through adder 108 before the value $N_p$ (two's comp.) and hence not adding thereto. However, the most significant six bits of 8 $N_{aver_0}$ are applied to the full adder 108 in synchronism with the corresponding six bits of $N_p$ (two's comp.) and as a result provides an output $\mp\Delta I$ on line 118 which is equal to the difference between $N_{aver_0}$ and $N_p$. Thus, by shifting the binary point three places to the left of 8 $N_{aver_0}$, the resulting six bits is the approximate digital value of $N_{aver_0}$. By using a two's complement circuit to change the number $N_p$ to a negative number, an adder can thus be used to give the difference $\mp\Delta I$ between $N_{aver_0}$ and $N_p$.

The output $\pm\Delta I$ on line 118 is applied through a second two's complement circuit 120 to a second full adder 121.

The second two's complement circuit 120 is provided to reverse the sign of the difference signal $\Delta I$ whereby the $\Delta I$ applied to the second full adder 121 will be positive if $N_p$ is greater than $N_{aver_0}$ and negative if $N_p$ is less than $N_{aver_0}$.

The 1.008 mHz. pulse train from the output of the "divide by 4" digital counter 32 of FIG. 3 with a timing pulse $T_{11}$, $T_{12}$ and $T_{13}$ from the computer-timing logic of FIG. 9, is applied to the inputs of a NAND gate 122 to cause the appearance of the 1.008 mHz. clock pulses during time $T_{11}$, $T_{12}$ and $T_{13}$ on the shift input of a 3-bit shift register 123, the information input of which is fed the 8 $N_{aver_0}$ signal from the line 112. Thus, the least significant three bits of the 9-bit word 8 $N_{aver_0}$ are shifted serially into the 3-bit register 123 before the $N_p$ (two's comp.) word appears. Since the output of the shift register 123 is delayed three bits in time after input thereto, it will be apparent that the least significant bit of 8 $N_{aver_0}$ appears at the input 124 of the second full adder at the same time that the first bit of the sign changed difference signal $\pm\Delta I$ appears at the other input thereof. The resulting output from the second full adder 121 must as shown below be a new 8-frame value 8 $N_{aver_1}$ for the intensity for the sample point under consideration and this new 8-frame value 8 $N_{aver_1}$ is fed back through the output line 126 of the second full adder 121 through a NOR circuit 128 having an input from the synch regulating circuitry of FIG. 12 as well as from the "suspicion −1" shift register of FIG. 8 hereinafter discussed.

Departing from the circuitry for a moment examine the arithmetic of the 8-FRAME AVERAGING UNIT comprised by the elements 106, 108, 110, 123 and 121, we define that:

$$N_{aver_1}=\frac{N_{aver_0}\times 7+N_p}{8}$$

or $8\ N_{aver_1}=N_{aver_0}\times(8-1)+N_p$ or $8\ N_{aver_1}=8\ N_{aver_0}-N_{aver_0}+N_p$ but $N_p-N_{aver_0}=\pm\Delta I$ by definition of $\pm\Delta I$ or $N_{aver_0}-N_p=\pm\Delta I$ then $8\ N_{aver_1}=8\ N_{aver_0}\pm\Delta I$ so that the new 8 frame value must therefore be the output of the second full adder.

Note that since these circuits have provision for sign determination it makes no difference whether $N_{aver_0}$ or $N_p$ is originally assumed negative. Because of logic simplicity, $N_p$ is made negative and $N_{aver_0}$ is positive and $\Delta I$ carries the proper sign and when algebraically added to 8 $N_{aver_0}$ at a proper place, yields 8 $N_{aver_1}$.

Since this apparatus is digitized in the binary number system, the number of frames over which $N_{aver_0}$ is taken is conveniently equal to the quantity $2^k$ where $k$ is an integer corresponding to the number of bits allocated in the memory 110 for representing the fractional portion of the stored average $N_{aver_0}$. Thus, it is convenient to average over 2, 4, 8...1024...frames. It has been found that averaging over relatively few frames renders the apparatus less sensitive to slow changes in light intensity, that is, to slow changes in the scene viewed. Thus, an 8-frame average would render the apparatus sensitive to relatively rapidly moving objects in the field of view whereas an average over 256 frames, for example, would increase sensitivity to slow changes in the field of view, for example, the passing of a cloud or the like. An average over 64 frames has been found to be a useful one for detecting a man moving at a substantial distance, for example, 100 feet from the camera.

The number of frames over which an average is taken has another effect, namely, as the number of frames over which the average is taken is increased the sensitivity of the apparatus to impulse noise decreases. A noise impulse occurring during a sample pulse has less effect on the average $N_{aver_1}$ if that average is taken over a large number of frames. Thus, it is contemplated that, depending upon the use to which the apparatus embodying the invention is to be put, the number of frames over which the average $N_{aver_0}$ is taken may be adjusted by appropriate selection of the number of bits assigned in memory for the fractional portion of the average and of the capacity of shift register 123.

Before returning to the original discussion, the mechanics of implementing a multiplication by 8 in a binary system should be examined. This is similar to multiplying by 1,000 in the decimal system in that to do it, one merely shifts the binary point three places to the right. Then to multiply a 6-bit binary word by 8, nine bit locations are required to contain the result. Therefore, the storage location must be nine bits long for each data point in this case.

The circuitry in FIG. 6 from the A/D converter above discussed is used to accomplish two main functions: first, provide a signal $\pm\Delta I$ which indicates the deviation of the light intensity at a given sample point from its value averaged over several previous frames, conveniently eight frames, and, secondly, to renew the 8-frame average value $N_{aver_0}$ of light intensity for that sample point by incorporation therein to the new light intensity deviation $\pm\Delta I$ for the present sweep pass that sample point.

Returning to the difference output $\pm\Delta I$ of the first adder 108, same is applied by line 118 to a $\Delta I$ shift register 129 which is of a capacity sufficient to handle the maximum number of bits for $\pm\Delta I$ which is this particular embodiment is six bits including one bit to represent the sign.

When the difference $\pm\Delta I$ has been shifted into the shift register 129, it is then shift into a "magnitude of $\Delta I$" circuit 121 of any convenient type for determining the absolute value thereof. Since the above arithmetic was done using complements, then if $\Delta I$ is positive its magnitude is the absolute value $|\Delta I|$, but if $\Delta I$ is negative, its complement is taken which is $\Delta I$'s absolute value $|\Delta I|$. The output of $|\Delta I|$ circuit 132 is connected in parallel to two separate magnitude comparator circuits 134 and 136 to the other side of which are connected parallel inputs from sources 139 and 141 of reference digital values $R_1$ and $R_2$, respectively. The magnitude comparators 134 and 136 function to compare the absolute value of $\Delta I$ with the references $R_1$ and $R_2$, respectively, and each provide an output pulse if the absolute value of $\Delta I$ exceeds same. These outputs then appear on the output lines 137 and 138 of the comparators 134 and 136.

Considering the suspicion register input logic circuitry portion of the processor shown in FIG. 7, same includes a set of NAND gate 146, 147 and 148 fed with a timing pulse at time $T_{26}$ from the timing logic of FIG. 9 through a line 149. The $\Delta I>R_1$ line 137 connects to the second input of NAND circuit 146 to provide an output therefrom in synchronization with the timing pulse at time $T_{26}$ when $|\Delta I|>R_1$. The $|\Delta I|>R_2$ line 138 connects to the second input of NAND circuit 147 and similarly results in output pulse therefrom at $T_{26}$ when $|\Delta I|>R_2$. It is further contemplated that a second input of the last NAND circuit 148 be driven from other alarm systems if desired to provide an output at time $T_{26}$, the response to triggering of such other alarms. Further, NAND circuits 152, 153 and 154 are connected in series with the aforementioned NAND circuits 146, 147 and 148 to invert the polarity of the output pulses thereof and to apply same to lines 156, 157 and 158. The lines 156, 157 and 158 connect parallel inputs of a 6-bit suspicion shift register 159. In the particular embodiment shown, the parallel inputs corresponding to the decimal values 1, 2, 4, 8, 16 and 32 are wired in such a way to the lines 156, 157 and 158 that different weighting is given to pulses appearing on the line 156, 157 and 158. Thus, in the particular embodiment shown, an output on line 156 is weighted by the decimal value 8, an output on the line 157 is weighted by the value 3 and an output on the line 158 is weighted by the value 4. It will be apparent that these weightings can be changed in numerical value as desired by changing the connections to the register 159.

In the particular embodiment shown, provision of the two $|\Delta I|$ comparators 134 and 136 allows the suspicion count associated with a sample point to increase as a step function of the magnitude of the difference $|\Delta I|$. As a result, the apparatus is, in effect, more suspicious of sample points for which the light intensity $N_p$ deviates widely ($|\Delta I|>R_1$) from its prior average $N_{aver_0}$ than of sample points at which there is only a moderate deviation ($|\Delta I|>R_2$) in light intensity $N_p$. However, it is contemplated that for the sake of economy that one of the comparators, for example comparator 136, might be omitted where deviations of $|\Delta I|$ above a given limit can be ignored.

Further circuitry indicated at 161 and 162 provides suspicion level signals relating to the occurrence of excessive changes of illumination at further sample points near the particular sample point in question in the same field and in a subsequent field, respectively. More particularly, a line 164 is coupled to the $|\Delta I|>R_1$ line 156. Line 164 connects to the set terminal of the "line-to-line correlate" flip-flop circuit 166. When $|\Delta I|>R_1$, the potential on line 164 sets the flip-flop 166 and causes same to apply a potential through the enable line 167 to one input of a NAND circuit 168. A further input of the NAND circuit 168 is fed from the end of conversion line 97 from the A/D converter of FIG. 6. The signal from the flip-flop 166 opens the NAND gate 168 to EOC pulses from the A/D circuit which occur at the end of digitizing each sample pulse. Thus, there is an output from the NAND circuit 168 for each sample point swept after the appearance of a sample point for which $|\Delta I|>R_1$. The output of the NAND circuit 168 feeds a 4-bit counter 171. The several outputs 173 of the 4-bit counter feed a gate circuit 174 of any convenient type in a manner to open same as selected sample points are scanned on the next scan line, for example, the 15th, 16th and 17th sample points, after the point in question, which selected sample points are closely adjacent the sample point in question. Thus, assuming that the sample point in question is the point 176 in FIG. 2, the NAND gate 174 will open for points 177, 178 and 179 in the next line of scan located immediately therebelow. It will be apparent that the gate 174 may if desired be wired to the 4-bit counter 171 to open for points in addition to or different than the points 177, 178 and 179 above mentioned. When open, the NAND gate 174 maintains a potential upon the input to a further NAND gate 181 through line 182. Line 182 also acts as a reset line for the line-to-line correlate flip-flop 166 and the 4-bit counter 171, resetting same when the NAND gate 174 closes after point 179 is scanned. Thus, should a pulse appear on the line 137 indicating that one of the sample points 177, 178 and 179 has $|\Delta I|>R_1$, such pulse will be impressed through gates 146 and 152 and lines 156 and 164 onto the second input of NAND gate 181 which is held open as points 177, 178 and 179 are scanned so that a pulse will appear on the output line 183 of NAND gate 181. The line 183 connects through a further potential inverting NAND gate 184 to one of the input terminals of the 6-bit shift register 159 above discussed. Although any one of the terminals may be used, in the particular embodiment shown, it is the fifth terminal to which the output of the NAND gate 181 is applied. Thus, a suspicion weighting of 16 is registered in suspicion register 159 when an excessive change in light intensity occurs at any one of several selected and subsequently sampled points in the next scan line, here the points 177, 178 and 179.

Although represented by a NAND gate symbol, the gate 174 is as above-stated gate circuitry of any type convenient to provide an output at sample points desired after a suspect point 176. For example, should the gate 174 be implemented by means of a simple AND gate or the equivalent, a NAND gate feeding an inverter, an enable signal can be applied by the resultant gate 174 to line 182 for a single point following the suspect point 176, for example, the point 178 in FIG. 2. More particularly, since the first and last sample points in each scan line are spaced closely in time so that only one EOC pulse appears for the both, a count of 15 in the counter 171 would cause a four input AND gate at 174 to enable the gate 181 for the 16th sample point following the suspect point 176, that is, the point 178 located immediately therebelow.

The field-to-field correlation circuit 162 is generally similar in arrangement to the line-to-line correlation circuitry 161 above discussed. The line 164 thus also connects to the set terminal of a field-to-field correlate flip-flop 187, which changes state and impresses enable potential through its output line 188 on one input of a NAND gate 189. The end of conversion line 97 from the A/D converter connects to the other input of the NAND gate 189 and as a result of the enable signal causes the NAND gate 189 to open and produce an output for each EOC pulse. Such output is applied to the input of the 9-bit counter 191. The parallel outputs 192 of the 9-bit counter 191 connect to a gate 193 of any convenient type in a manner to cause a potential to appear on the output thereof for selected EOC pulses of the next field, for example, occurring 261—265 sample points after the disturbance at the original sample point, i.e., after the field-to-field correlate flip-flop 187 had its state changed by the error pulse on line 164. The corresponding points in the next field are indicated in FIG. 2 by the reference numerals 195—199. Line 164 connects to the lower input of a NAND gate 201, the other input end of which connects to the output of the NAND gate 193. Thus, the NAND gate 201 is enabled to conduct should a pulse, indicating $|\Delta I|>R_1$, appear on its lower terminal as any one of the points 195—199 in infield No. 2 of FIG. 2 is swept after the occurrence of a $|\Delta I|>R_1$ condition at sample point 176 in field No. 1. It will be apparent that, with suitable rewiring of the connection between the gate 193 and counter 191, the gate 201 may be enabled for sample points other than 261st—265th points occurring after an excessive change of light intensity at sample point 176. As the 265th sample point is swept, the counter 191 closes down the NAND gate 193 which changes the potential on the reset line 202 connected to the reset terminals of the field-to-field correlate flip-flop 187 and 9-bit counter 191 to reset same for further actuation.

The output of the NAND gate 201 is passed through a further NAND gate 203 to invert same and thence is impressed on one of the input terminals of the 6-bit shift register 159, here the sixth terminal to add the decimal value 32 to the suspicion level in the register. Thus, although it will be recognized that the input terminal of the 6-bit register 159 used may be varied, the occurrence of an error point in a second field near an error point in the first field is here given a relatively heavy suspicion weighting.

As in the line-to-line correlation circuitry above discussed, the gate 193 though shown as a NAND gate actually may comprise a variety of gate configurations depending on the points desired to be correlated. As a simple example, the gate 193 may comprise a NAND gate followed by an inverter to provide the proper output signal which in turn may be wired to the output of the 9-bit counter in a manner to enable the NAND gate 201 for a single point in the next field after a suspect point, for example, the sample point 197 located adjacent the suspect point 176.

Although a field-to-field correlation is performed in the present embodiment, it is contemplated that, for example, by providing additional capacity in the counter 191, a suspect point could be checked in a subsequent frame for providing a frame-to-frame correlation.

The output of the 6-bit shift register 159 connects to the third full adder discussed hereinafter with respect to FIG. 8. It will be noted that a read line 204 from the computer-timing logic of FIG. 9 connects to the 6-bit shift register 159 and at a time $T_{27}$ after the A/D circuit starts to digitize, the shift register 159 reads the signals above mentioned impressed on its input terminals. In addition, the 6-bit shift register has a clock input line 206 energized by a NAND gate 207. The NAND gate 207 has inputs from the 1.008 mHz. source 32 of FIG. 3 and is held open by the timing logic of FIG. 9 during the interval $T_{30}$—$T_{40}$ after each sample pulse occurs. Such allows the 1.008 mHz. clock pulses to be applied to the shift register 159 to shift out, along line 209, the data applied thereto from lines 156 through 158 and NAND circuits 184 and 203 to the third full adder 211 appearing in FIG. 8.

The third full adder 211 also has an input connection 212 from the delay line memory 110 through the NAND circuit 116. In the present embodiment, eight bits are allowed in the memory section of each sample point for suspicion level storage, although this allotment may be varied. Thus, stored suspicion data based on previous scans of a given sample point reads out of the delay line during the time interval $T_{30}$—$T_{40}$, after such point is sampled in coincidence with shifting of the current digitized suspicion level out of the shift register 159 on line 209. Thus, the third full adder 211 adds the new and stored digitized suspicion level signals from the suspicion register 159 of FIG. 7 and delay line 110 and impresses the summed suspicion level signal S on output line 213 thereof.

Line 213 connects to the input of a "decrease by one bit" circuit of any convenient type indicated at 216 which decreases the digitized value S of the suspicion signal on line 213 by a value of 1 (although reduction by other values is contemplated) and applies the resulting value S—1 through line 217 to the suspicion —1 shift register 218, here an 8-bit shift register. The reduced signal S—1 is applied through a NAND gate 219 to a line 221 which feeds back to the input of the sequential memory through the NOR gate 128 seen in FIG. 6 so as to provide a stored, reduced digitized suspicion level S—1 when the same sample point is scanned in the next frame.

A zero detect flip-flop 222 is provided between the line 213 and the NAND gate 219 and is arranged to disable to NAND gate 219 when the suspicion signal S on line 213 is zero so as to avoid attempting to impress a value less than zero, which would be meaningless, on the suspicion portion of the memory segment for the sample point in question. A reset signal at time $T_{42}$ for the given sample point is impressed through lines 223 and 224 on the decrease by one circuit 216 and zero detect flip-flop 222 to ready same for the next scanned sample point.

Finally, the digitized suspicion output S appearing on line 213 is impressed serially upon a suspicion accumulator shift register 226. The accumulator register 226 is caused to read out by a signal applied thereto from a NAND circuit 227 which has inputs fed with 1.008 mHz. clock pulses from source 32 in FIG. 3 and a timing pulse $T_{24}$ extending through time $T_{31}$ from the timing logic of FIG. 9. The eight parallel output terminals of the suspicion accumulator shift register 226 are connected respectively to an 8-bit digital comparator 228, a 4-bit digital comparator 229 and a further 4-bit digital comparator 231. Digital reference generators 234, 235 and 236 generating respective reference signals $R_3$, $R_4$ and $R_5$ are connected to the reference input sides of the respective digital comparators 228, 229 and 231. Thus, when the digitized suspicion level S for a given sample point is read out of the accumulator register 226, the digital comparator 228 compares same to the digital reference signal $R_3$. For sample points having a suspicion-digitized signal S greater than $R_3$, the digital comparator 228 applies a pulse through an output line 237 to a NAND gate 238. The other input of NAND gate 228 is supplied with a timing pulse $T_{33}$ from the timing logic of FIG. 9. The reference $R_3$ preferably is a relatively high digital value, for example, 180. With both inputs thus energized the NAND circuit 238 applies a low potential through an output line 239 to a further NAND gate 240, the resulting high output of which is connected to the alarm signal line 26 discussed above with respect to FIG. 1 for energizing the alarm.

The digital comparator 229 and digital comparator 231 have the suspicion signal S impressed on the upper sides thereof and compare same to the digital reference signals $R_4$ and $R_5$ impressed on the lower sides thereof from the reference circuits 235 and 236. The reference leads may be chosen as desired, though being preferably less than $R_3$ and may for example be 20 and 100, respectively. Thus, the comparator 229 will provide an output pulse on its output line 242 when $R_4$ S $R_5$ and both the comparators 229 and 231 will provide output pulses on their output lines 242 and 243 when $R_5$ S. The lines 242 and 243 feed respective inputs of respective NAND circuits 246 and 247, the other inputs of which are fed with timing pulses $T_{41}$ and $T_{42}$, respectively, from the computer-timing logic of FIG. 9. The outputs of the NAND circuits 246 and 247 are applied to the inputs of a further NAND circuit 248, the output of which connects as indicated at 251 to the input terminal of a totalizer counter 250, here of 4-bit capacity. When the NAND circuits 246, 247 and 248 are so connected, the NAND gate 248 provides both "and" and "or" functions and will provide a high output should the suspicion level S exceed either of the limits $R_4$ and $R_5$. The parallel outputs of the totalizer counter 250 are connected to one side of a digital comparator 252. A digital reference signal $R_6$ is impressed by a reference generator 253 on the lower side of the digital comparator 252 for comparison thereby with the number in the counter 250. The digital comparator 252 provides a signal when the totalizer count T exceeds the reference $R_6$, which signal is applied to the input of a NAND circuit 254.

A timing pulse is applied to the other input of the NAND gate 254 from the timing logic of FIG. 9 at time $T_{41}$, after the sample pulse for the sample point in question. The NAND gate 254 has its output connected to the second input of the NAND circuit 240 above described. The NAND gates 238, 240 and 254 are arranged to work in the same manner as NAND gates 246, 247 and 248 above described, i.e., when either or both of the NAND gates 238 and 254 energize the NAND gate 240, it provides an output pulse on the alarm signal line 26, which as above mentioned causes actuation of the alarm at monitoring position 24 of FIG. 1.

FIG. 9 discloses a computer-timing logic circuit 261 for providing a series of successive pulses of predetermined and different lengths following each sample pulse for timing various parts of the processor 17 as above described. The timing logic 261 may be of any convenient type but a preferred embodiment is illustrated. The 1.008 mHz. clock 32 of FIG. 3 supplies one input of a NAND circuit 262 with clock pulses. The other input of the NAND circuit 262 connects through line 263 to a delay line control flip-flop circuit 264. The delay line control flip-flop 264 has a set input terminal 266 energized by the start digitize signal also applied to the A/D converter 62 by line 85 (FIG. 6) to initiate operation of the A/D converter. This signal is here the sample pulse appearing on line 15 of FIG. 3 which is applied to the A/D converter and delay line control flip-flop by any convenient conductor, not shown. The start digitize signal thus opens the NAND gate 262 and the 1.008 mHz. clock pulses are serially applied to a 6-bit counter 267. Output is taken in parallel from the 6-bit counter 267 through a network generally indicated at 268 to the inputs of a plurality of NAND gates indicated at 270—280 in a manner to sequentially open said gates for differing, preselected intervals following scanning of a given sample point, the last gate 280 being energized prior to the next sample point is scanned so as to energize the reset terminal of the delay line control flip-flop 264 for a further cycle of operation. Such reset here occurs when the counter has filled and returned to zero to eliminate any need for resetting same directly.

NAND gate 270 provides a single output pulse, noted as $T_1$—$T_{20}$, which spans the interval from the first to the 20th clock pulse and since the clock operates at 1.008 mHz, in this embodiment, the interval $T_1$—$T_{20}$ is about 20 $\mu$ sec. long. Similarly, NAND gate 271 here provides a 3 $\mu$ sec. pulse $T_{11}$, $T_{12}$, $T_{13}$ which spans the 11th, 12th and 13th clock pulses after the sample pulse. The remaining gates have outputs similarly designated.

The timing intervals discussed above are present for purposes of illustration and it will be apparent that other timing intervals may be selected which will maintain the apparatus operative.

FIG. 10 illustrates a preferred memory synchronization circuit 281. The memory synch circuit 281 checks that the memory 110 and, hence, the processor circuit 17 remain in synchronization with the television camera sweep. Thus, this circuit plays no direct part in the alarm system but merely serves to warn the operator should a catastrophic failure of synchronization occur. Further, the circuitry 281 is required only when a sequential memory device such as a delay line or drum storage is used for the memory but would not be required should any directly addressable memory system such as the core memory be used in the place thereof.

The memory synch circuit 281 includes a 6-bit synch register 282 which has a serial input on line 283 from the NAND circuit 117 (FIG. 6) fed from the memory 110. It will be noted that a timing pulse $T_{48}$—$T_{54}$ is applied to the NAND circuit 117 whereby only the synch portion of the memory section assigned to the sample point in question, here six bits in length, reads out serially through the NAND circuit 117 and line 283 to the input of the synch register 281. The synch register has all outputs connected in parallel to a digital comparator 284, the other side of which is fed from a synch word reference source 286. When the synch word fed from the synch register to the digital comparator is not equal to the synch reference word, an output appears on the output line 287 of the digital comparator 284. This output is applied through a NAND gate 288, opened at time $I_{56}$ by the timing logic of FIG. 9, and line 289 to the set input of one-shot multivibrator 291, here having a 10 $\mu$ sec. output. An out-of-synch alarm 292, such as a lamp or audible alarm, preferably located at the operator console 24, is energized by the output line 293 of the one-shot multivibrator 291. Thus, should the out-of-synch condition result in a spurious suspicion alarm, the lamp 292 tells the operator that the suspicion alarm may have been caused by an out-of-synch condition and that the apparatus 10 is not operating correctly.

Although it is contemplated that the CDEF-RSTU gate 51 may be of any convenient construction, a preferred form is illustrated in FIG. 11. The preferred gate 51 uses not only the primary counter outputs C, D, E, F, etc., but the complements, (i.e., the waveform inverted) thereof, as well. Such complements are normally available from the counters 34 and 41 or may be obtained simply by inverting the primary C, D, E, F, etc., outputs. The matching gate 51 here includes a set of four double-input NAND gates 296 through 299, the inputs of which are labeled $\overline{C}$,R; $\overline{C}$,R; $\overline{D}$,S and D,S. A further and similar set of four NAND gates 301 through 304 are also provided, the inputs thereof being labeled E,$\overline{T}$; $\overline{E}$,T; F,$\overline{U}$ and $\overline{F}$,U. Here $\overline{R}$ designates the complement of R. Thus, for example, when $C\neq\overline{R}$ then C R and a nonzero signal appears on the output of NAND gate 296. The set of NAND gates 296—299 feeds a four-input NAND gate 306 and the set of NAND gates 301—304 feeds a similar four-input NAND gate 307. Thus, when $C\neq\overline{R}$, $\overline{C}\neq R$, $D\neq\overline{S}$ and $\overline{D}\neq S$ a zero output appears at NAND gate 306. Similarly, when $E\neq\overline{T}$, $\overline{E}\neq T$, $F\neq\overline{U}$ and $\overline{F}\neq U$ a zero output occurs at NAND gate 307. The outputs of NAND gates 306 and 307 are fed through inverting NAND gates 308 and 309 and appears as nonzero signals on two respective inputs of a further four-input NAND gate 311. The four-input NAND gate 311 is provided with a 1.008 mHz. pulsed input from the clock or divide by four counter 32 of FIG. 3 through a NAND gate 312. This prevents the NAND gate 311 from producing noise occurring between the 1.008 mHz. clock pulses. In addition, although no fourth input is provided in the preferred embodiment described above, a fourth input indicated in broken lines at 313 may be provided where the modified sampling circuitry hereinafter described is used in place of the circuit of FIG. 3. Thus, the NAND 311 will conduct upon concurrence of the three inputs from NAND gates 308, 309 and 312. If the fourth input line 313 is provided, for use with the modified system, a signal on line would also be required for NAND gate 311 to conduct. The output of the NAND 311 passes to a one-shot multivibrator 314 which in the particular embodiment shown has an 8 $\mu$ sec. output pulse which is fed to a similar one-shot multivibrator 360 having a considerably shorter output pulse here of 0.6 $\mu$ sec. duration which is placed on line 15 of FIG. 3 as the sample pulse.

FIG. 12 illustrates the preferred form of alternate field generator shown in block form at 46 in FIG. 3. The alternate field synch generator 46 includes the one-shot multivibrator 321 fed from the vertical sweep line 39. In the particular embodiment shown, the one-shot 321 is a 1 $\mu$ sec. device and provides a negative output pulse through a reset line 322 to the up-down line counter 41. The one-shot multivibrator 321 has a positive pulse output which is applied through the line 323 to one input of a NAND gate 324. The second input of the NAND gate 324 is fed from the horizontal sweep line 36. The NAND gate 324 provides an output $\delta$ to a further NAND gate 326. The horizontal sweep signal appearing on line 36 is also impressed on the up-down line counter 41 as a clock signal, as indicated in FIG. 3, by line 42. The other input $\gamma$ of the NAND gate 326 connects to the output line 327 of a further NAND gate 328, one input $\alpha$ of which is connected to the line 322. The other input line 329 to NAND gate 328 carries a signal $\beta$ from the output of NAND gate 326. The output of NAND gate 326, the $\beta$ signal is applied through the up-counting line 48 to the up-down line counter 41. The complement of the $\beta$ signal is derived by applying the $\beta$ signal to an inverter 331 the output of which is $\beta$ bar and is applied through line 49 to the up-down line counter 41. It will be noted that the up-down line counter 41 as schematically shown in FIG. 12 may be of the type providing not only the requisite primary waveforms R, S, T, etc., but the complements thereof, $\overline{R}$, $\overline{S}$, $\overline{T}$, $\overline{U}$, etc. as well.

The relationship between $\alpha$, $\beta$, $\gamma$ and $\delta$ is shown in the truth table below.

TABLE II

| $\delta$ | $\alpha$ | $\beta$ | $\gamma$ |
|---|---|---|---|
| 0 | 0 | 1 | 1 |
| 0 | 1 | 1 | 0 |
| 1 | 0 | 0 | 1 |
| 1 | 1 | (1) | (1) |

1 No change.

FIG. 13 discloses several of the waveforms present in the alternate field generator 46 of FIG. 12. Thus, the vertical sweep signal V.S. causes the one-shot 321 to produce a positive-going pulse O.S. and a complemental negative going pulse $\overline{O.S.}$ or $\alpha$ at the beginning of each field. At the beginning one of the two fields in each frame, the positive going pulse O.S. coincides with a positive swing in the horizontal sweep signal H.S., both such signals being applied to NAND gate 324 to provide a negative-going pulse $\delta$ at the output thereof for signaling the start of one field of a frame.

In the stated television scan period, used in this embodiment for purposes of illustration, there are 525 horizontal scan lines per frame and, thus, 262.5 lines per field. The horizontal sweep signal H.S. cycles once per horizontal line and since it swings positive at the beginning of one field it must therefore swing negative at the beginning of the next field, as indicated in the right-hand portion of FIG. 13. Thus, there will be a negative $\delta$ pulse for one field of a frame and not for the next.

Referring again to table II, at the beginning of one field negative going $\delta$ and $\alpha$ pulses will be applied to the NAND gates 226 and 228 resulting in a positive going $\beta$ pulse applied to the up-counting line 48 to cause the up-down line counter 41 to increase its count in response to clock pulses from the line 42. On the other hand, as indicated in the third line of FIG. 2, at the start of alternate fields, a negative going $\alpha$ pulse will occur without a corresponding negative going $\delta$ pulse with the result that the signal level on line 48 will drop and a positive signal will appear on the output of invertor 331 to be applied by down-counting line 49 to the up-down line counter 41 to cause same to reverse its direction of counting of clock pulses from line 42. It will be noted from the fourth line of table II that when negative going $\delta$ and $\alpha$ pulses are both absent that the $\beta$ signal remains unchanged. Thus, the $\beta$ signal and consequently its complement change only at the beginning of each field, In consequence, the up-down line counter counts up for one field in a frame and decreases its count for the next field in the frame, repeating the cycle for each frame.

Referring again to FIG. 6, it has been found that testing of the circuitry is facilitated when the data stored in the delay line 110 can be maintained without change, that is, can be maintained without the normal updating thereof by the $N_{aver_1}$ line 126 and the S—1 line 221. To this end, a triple-pole, double-throw switch 461 is provided. The switch 461 has an armature 462 which in its normal operating position is interposed in series in the $N_{aver_1}$ line 126 ahead of the NOR gate 128 and is alternatively movable to a test position where it breaks the line 126. The switch 461 includes a further armature 463 which in its normal operating position connects in series in the S—1 line 221 and which is alternatively movable to a test position whereby the line 221 is broken. The final armature 464 of the test switch 461 is interposed in a conductor 466 connected between the output of delay line 110 and an input of the NOR gate 128. In its position for normal operation of the apparatus, the armature 464 opens the line 466. In its alternative, test position, the armature 464 completes the connection of the delay line output through the line 466 to the NOR gate 128.

Thus, with the test switch 461 in its normal operating position, multiframe average data from the line 126 and suspicion count data from the line 221 are carried through the corresponding armatures 462 and 463 to the NOR gate 128 feeding the delay line 110, the output of the delay line being routed to the inputs of NAND gates 111, 116 and 117. On the other hand, when it is desired to perform testing upon the apparatus embodying the invention, the test switch 461 is moved to its test position whereby the lines 126 and 221 are opened and data at the output of delay line 110 is cycled through line 466 in NOR gate 128 back to the input of the delay line without change.

With the test switch 461 incorporated in the circuit, it is contemplated that with the provision of very little additional circuitry, which will be obvious in view of the present disclosure, the apparatus may be used to compare a scene viewed by the transducer 11 with a fixed pattern, deviations from the fixed pattern resulting in an alarm or other output. As an example then, the present apparatus could be used to detect the absence of a part in a multipart assembly on a production line, providing an alarm or rejecting the deficient assembly as an output.

If the apparatus of the present invention is to be used as a pattern comparison device, the test switch 461 is first placed in its normal operating position and the master pattern on which future comparisons are to be based is shown to the camera 11 for a sufficient time as to place in the delay line 110 digital representations of the light intensities at various sample points in the master pattern. The test switch 461 is then switched to its test position whereat the data representing the light intensity at the sample points in the master pattern is continuously recirculated through the delay line 110 in synchronism with the scan of the television camera. Sample patterns, for example, multielement assemblies whose completeness is to be checked, are then placed successively in front of the television camera 11 and scanned thereby. The difference between the stored master data and scanning data from the sample pattern to be compared are applied to the first full adder 108 in FIG. 6 in the same manner as above described with respect to the normal observation of a changing scene. Differences between the stored and sample data are applied through the shift register 129 and magnitude circuit 131 to the comparator 134. An output appears on line 137 when $|\Delta I|>R_1$.

The resulting output on line 137 may be used to feed means such as an alarm or rejecting device 469 since the output on line 138 indicates an excessive deviation of the sample pattern scanned from the master pattern which it is to duplicate. Thus, a double-pole switch 468 is placed between the alarm 469 and the line 137. The switch 468 is in its open normal position when the apparatus is in its normal or motion detection mode. However, the switch 468 may be closed by moving the armature thereof to its pattern comparison position for connecting the pattern comparison alarm 469 to the line 138.

It will be apparent that by increasing the density of sample points, physically smaller deviations in the pattern scanned, such as errors in printed matter, can be detected. On the other hand, for many pattern comparison purposes, sample points having relatively wide spacing will give satisfactory results.

OPERATION

The operation of this apparatus is readily described in terms of a particular set of algorithms which are listed immediately hereinbelow.

1. The digitized value $N_p$ of the illumination intensity level at a sample point in a field of scan $F_1$ is compared to the 8-frame average digitized value $N_{aver_0}$ for that sample point, as taken from the corresponding location in memory, to obtain $|\Delta I|$ (absolute value of the change in the digitized representation of the illumination intensity).

2. If the difference resulting from this comparison is within a specified limit, ($|\Delta I|<R_1$), then the system is maintained in "-status quo."

3. If the difference resulting from the comparison in Step 1 is outside the limit set in Step 2, ($|\Delta I|>R_1$), then note is made of this by placing a suspicion value, here 8, into a 6-bit suspicion register 159 by applying a potential to the fourth place input thereof.

4. If the difference resulting from the comparison in Step 1 is outside a second limit ($|\Delta I|>R_2$), indicating a very large discrepancy, then an additional suspicion value, here 4, is placed into the suspicion register 159.

5. The condition where $\Delta I>R_1$ starts two counters. The first 5-bit correlate counter provides for the opening of a logical window at subsequently scanned sample points directly beneath the point in the TV picture where the $\Delta I>R_1$ has been indicated. Should a $\Delta I>R_1$ condition be encountered at one of these subsequent points, a still further suspicion value, here 16, is placed into the suspicion register along with those values encountered in Steps 3 and 4 above. This gives line-to-line correlation, or "in field" correlation.

6. The second counter, the 9-bit correlate counter provides for the opening of a logical window on TV horizontal scan lines 261, 262, 263, 264 and 265 which are displaced one field in time from the original point which indicated $\Delta I>R_1$. Should a $\Delta I>R_1$ condition occur during this logical window opening (i.e. one field later) then another suspicion value, here 32, is placed into the suspicion register along with appropriate numbers from steps 3, 4 and 5 above. This provides field-to-field correlation or "in frame correlation," however the 9-bit correlate counter and filled correlate flip-flop are reset allowing another point experiencing a $\Delta I>R_1$ condition to use the counter for field-to-field correlation, meaning that if only one sample point is experiencing a $\Delta I>R_1$ condition it could use the 9-bit correlate counter for increased suspicion building for one field out of each two fields.

7. To take into account the fact that other alarm systems may be signalling which increases the probability that the disturbance is significant) an input from such other alarm devices is placed into the suspicion register 159. The value associated with this input is here three, but of course it may be varied at will depending on reliability of alarm device.

8. When all inputs associated with a given sample point are inserted into the suspicion register 159, the registers contents are added to a section of the memory 10 associated with past suspicions for that sample point.

9. So that the suspicion value in the suspicion portion of the memory 10 associated with the given sample point does not overflow due to spurious noise, at each sample and computer cycle, a one is subtracted from the results of Step 8 before reentering the memory 10.

10. The register contents S from Step 8 above are compared with a reference (Ref. $R_3$). When suspicion level 5 rises above reference (Ref. $R_3$), i.e. $S>R_3$, then an alarm signal is displayed at some centralized location 24 or may be a loud audible alarm.

11. For detecting widely diverse errors which may occur randomly (for example detection of fragments from an explosion) the totalizer counter is used.

12. Inputs to the totalizer counter 250 are derived from digital comparator 229 and 231. Reference (Ref. $R_4$) is set for a suspicion level $0<R_4<R_5$ so that it causes an output from digital comparator 229 when the suspicion level S jumps to some low value S greater than $R_4$. Reference (Ref. $R_5$) is set so that $R_4<R_5<R_3$ which means it causes digital comparator 231 to produce an output when the suspicion level S rises to a value greater than Ref. $R_4$ and Ref. $R_5$. Since the totalizer counter 250 gets reset at the beginning of each frame, it then counts the total number of times that the suspicion location on the delay line has increased to some level above Ref. $R_4$ or Ref. $R_5$ as the case may be. When the total count in the totalizer counter 250 rises above reference Ref. $R_5$ then the same alarm as described above in Step 10 is initiated.

The operation of the circuit is believed adequately presented by the algorithms above and in the detailed description section above presented and no further repetition thereof is believed required.

The effectiveness of the present invention depends primarily on its ability to differentiate meaningful changes in a scene from spurious changes in the scene and in the signals which it processes, i.e., noise. Sampling not only acts as a filter for impulse noise, but also reduces the amount of nonsignificant data that must be operated upon; i.e., reduces redundancy.

The noise encountered in a video signal falls into two major categories: "white" noise and impulse noise. The "white" noise is generated by the components in the system and consists of a uniform power spectrum distributed over a wide band of frequencies. Since this noise is present at all times, sampling the data and holding on a capacitor tends to average the noise while not appreciably affecting the data. However, proper selection of the sample aperture time ($t_a$) is of great importance, since the range of horizontal object size ($x_h$) detectable is a function of ($t_a$).

Sampling can also effect considerable improvement when impulse noise is a problem as it is in any television system. If the noise pulse is shorter than the sampling period then there is a chance that the pulse will be missed completely. A continuous system would of course not have any chance of rejecting the noise. As an example: consider a system taking a narrow width sample, say 0.5 $\mu$ sec., every 60 $\mu$ sec. of a video signal containing noise pulses of 10 $\mu$ sec. duration occurring on the average of twice every 60 $\mu$sec. A noise pulse would be present on the continuous signal once every 30 $\mu$ sec. on the average. The sampled signal would contain a noise pulse on the average of once every 180 $\mu$sec. Thus, a considerable improvement has been realized.

As the width of the noise pulses approaches the sampling period, the above improvement deteriorates and other methods of noise reduction must be used. The basis of the method used is the fact that there is strong correlation between the video signal from one frame to the next, but noise has essentially none. By averaging the video signal at one point in the picture over several frames, a noise-free measure of the level is obtained.

A most effective and inexpensive method of implementing the averaging for removing remaining noise is to use a digital computer and memory operating in pure binary. The digital system has an advantage over analog devices such as video storage tubes or magnetic recording devices with balancing amplifiers in that these devices are themselves sources of noise. Also a serial binary arithmetic unit easily implements the above-mentioned averaging equation, written here in its more general form:

$$N_{\text{aver}_1}=\frac{N_{\text{aver}_0}(2^k-1)+Np}{2^k}$$

where $N_{\text{aver}_1}$ is the new average value representation of the illumination level at a sample point to be stored in memory while $N_{\text{aver}_0}$ is the average as established over $k$ frames of TV video, and $N_p$ is the present value representative of the illumination level at a sample point.

Manipulation of this equation above gave $$2^kN_{\text{aver}_1}=2^kN_{\text{aver}_0}\pm\Delta I$$

where $\Delta I$ is a representative difference value between the present illumination ($N_p$) and the average illumination ($N_{aver}$) for the point, indicating that the mechanism which determines the ($\Delta I$) or the contrast differences also updates the average which is subsequently stored in memory, thereby eliminating the need for time-consuming update cycles. Systems which require specific times for memory update cycles run a greater risk of storing noise in memory because full advantage is not taken of the averaging concept.

The averaging technique also allows the system to ignore as a form of optical noise, slow changes in light level in the scene viewed.

When the value $N_p$ for a point is suddenly different than it has been for the past several frames it must be decided whether this change is the result of a change in the viewed scene or a noise pulse. For a first test, the amount of change ( $|\Delta I|$ ) must be greater than a fixed value, $R_1$. This assures that small fluctuations in the video level due to interference and "white" noise will not cause triggering. If the change in intensity ( $|\Delta I|$ ) is greater than $R_1$, it could still have been caused by a high-amplitude noise pulse. The use of a second comparison reference $R_2$ assists in testing this possibility, but to test it further the lack or correlation of noise is used. If the disturbance was due to noise, it is extremely unlikely that sample points in the vicinity of the initial disturbance will be affected during that field and even more unlikely that the same points will be affected during the next field. To apply these tests, the digital correlators for both in-field and field-to-field correlation are used.

To evaluate the results of a disturbance, the suspicion level concept is a versatile tool. At a given point the result of a disturbance test and the two correlation tests are added in a weighted manner. The weights are chosen so that the test least subject to noise (i.e., the field-to-field correlator) has the greatest weight. The test most subject to noise (i.e., change of level greater than $R_1$) has the least weight. For any sample point when the suspicion level(s) exceeds a certain value, $R_3$, the intrusion alarm is triggered. The suspicion level(s) is reduced by one every frame. Thus, while it is impossible for random noise pulses to build up a suspicion level great enough to cause alarm, a consistent change at a single sample point will cause such an alarm.

The totalizer 250 is capable of warning of lower amplitude changes at many points in the scene viewed due to some mass event.

At the sweep rate used in the present invention, each horizontal sweep will take about 64 $\mu$ sec. and since the sample point pattern repeats every 16 lines, the time interval between successive sample points will be 64÷4 $\mu$sec. Since bits can be produced in the present apparatus at the rate of about 1/$\mu$ sec. the spacing between sample points allows up to 64 bits of information to be stored and processed for each sample point in the pattern of FIG. 2. Since in the present embodiment, nine bits are stored in the memory section assigned to each sample point for the light intensity average 8 $N_{\text{aver}_0}$, eight bits are used for the reduced suspicion level S−1 and six bits are used in the out-of-synch detection circuitry of FIG. 10, a total of 23 bits, it will be apparent that there is sufficient unused space in the delay line assigned to a sample point of the television camera 11 for data for a sample point from a second camera 27. This can readily be carried out, for example, by closely packing in time the eight-frame average, suspicion and synch words for a sample point of camera 11 and placing in the memory thereafter the corresponding words for sample point from the other camera 11. Such will require compacting of the computer-timing logic pulses to enable processing of the data for one point in half the above time. In this way, several cameras may use the timing and processing means on a shared-time basis to decrease the equipment cost without compromising the performance of the system.

In addition, should it be desired to reduce the number of sample points in a given field by reducing the density thereof, this will provide additional time in the memory which can be used on a shared-time basis by still additional cameras. Further, should it be desired to reduce the resolution of the system, fewer bits may be made available for each of the intensity average, suspicion and synch words to allow an even further reduction of memory space required for a given sample point.

On the other hand, it is contemplated that plural cameras be alternatively switched to the sampler 13 by analogy to switching of cameras to the monitor 21 by switch 22.

Although the preferred mode of scanning and sampling is disclosed in detail above, it is contemplated that within the broader aspects of the invention that a mechanical sampling method may be employed where less flexibility of sampling and lack of simultaneous visual monitoring can be tolerated, such method employing sampling simultaneously with scanning as by masking the camera lens with a multiperforate card or by use of a multielement photoelectric matrix in place of the above-disclosed camera and sampling circuitry.

It should be noted that the circuit blocks in FIGS. 3—12 above are either available from suppliers such as the Engineered Electronics Company above mentioned as integrated circuit modules on printed circuit boards or are constructible from several such modules.

Although the above discussion of operation has been cast in terms of causing an alarm when the sample point illumination value $N_p$, difference signal $|\Delta I|$ and suspicion level S exceed certain values, it is contemplated that in certain applications it may be desirable that one or several of these parameters be equal to or be less than, rather than greater than, its comparison reference as a condition prerequisite to energization of an alarm.

Such would be desirable for monitoring a domain in which, for example, a certain minimal level of change is to be maintained and the system is to detect any drop in activity below this level.

MODIFICATION

FIG. 14 discloses a modified version 400 of the sampling circuit of FIG. 3 including a manually actuable sample density selector switch 401 having several sections 402, 403, 404 and 406 connected to inputs C, D, E, and F of the matching gate 51A, such sections each having a plurality of alternatively selectable poles, one of which is indicated at 407. The poles 407 of each switch section connect to several of the parallel outputs of the six bit counter 34A. Here, for example, section 402 can alternatively select the A, B and C outputs of counter 34A, the section 403 can select outputs B, C and D and so forth. Thus, the sample point density can readily be changed by resetting switch 401, several possible patterns being indicated in table I above.

Where the matching gate 51A is of the type shown in FIG. 11 requiring complemental inputs ($\overline{C}$,$\overline{D}$, etc.) as well as primary inputs (C,D, etc.) the complemental inputs to the matching gate are preferably supplied by selecting a counter 34*a* and an up-down line counter 41 having both primary and complemental outputs, so that the primary wiring can be duplicated for the complemental signals. Thus, the cabling and switching for complement waveforms though not as fully shown as the primary cabling and switching in FIG. 14, will be understood to duplicate same. The complemental wiring thus is merely schematically represented by a multiconductor bundle 421 extending from the counter 34A to a complemental switching portion 422 of the sample density selector switch 401, a further bundle of conductors 423 between the complemental switching portion 422 and the matching gate 51A and finally by a further bundle of conductors 424 extending from the complement outputs of the up-down line counter 41 to the matching gate 51A. The primary and complemental switch should be adjusted to corresponding positions. It will be understood that where a matching gate 51A is of a type not requiring complemental inputs that the aforementioned bundles 421, 423 and 424 and the complemental switching portion 422 of the sample density selector switch may be omitted.

The circuit 400 is further modified by insertion of a sample programmer circuit 411 thereinto. The sample programmer has inputs from the C, D, E, F, V, W, X, Y and Z outputs and their complemental outputs of the up-down line counter 312, which is preferably similar to the counter 41 of FIG. 3 but here has an extra output V (and $\overline{V}$). The sample programmer 411 provides an output pulse on line 418 for preselected ones only of the sample points shown in FIG. 2 above. Thus, by proper setting of the sample programmer 411, only points appearing in a selected portion of the scene, as shown by the broken line box in FIG. 2, will be sampled. A preferred embodiment of the sample programmer is disclosed in FIG. 15.

The sample programmer 311 of FIG. 15 includes a plurality of inputs 331. Although the particular inputs may be varied at will, by appropriate wiring of the sample programmer to various counters in the apparatus, it is preferred that inputs to the sample programmer consist of two groups, one group 432 related to the placement of sample points in a scan line and the other group 433 related to the placement of groups of successive scan lines in a field. To this end, the sample programmer 311 is provided with inputs C, D, E and F and their complements $\overline{C}$, $\overline{D}$, $\overline{E}$ and $\overline{F}$ as the first group 432, the F and $\overline{F}$ inputs cycling once each scan line and the E, D and C inputs with their complements cycling at successively doubling rates. The group 433 comprises inputs V, W, X, Y and Z and their complements $\overline{V}$, $\overline{W}$, $\overline{X}$, $\overline{Y}$ and $\overline{Z}$, V and its complement $\overline{V}$ cycling once every 32 lines (the waveform V is in other words at high potential for 16 scan lines and at low potential for the following 16) and the W, X, Y and Z waveforms with their complements cycling at successively doubled intervals.

A first group of switches 434 includes an individual multithrow, single-pole switch assigned to each primary-complement input set. Thus, for example, one such switch 436 has poles connected to the C input and the $\overline{C}$ input and a third pole, termed the "off" pole which floats. The armature of switch 436 is actuable to select any one of these poles. A similar set of switches 437 is provided for the group of inputs 433, each switch of the set 437 having an armature arranged for alternatively selecting a primary input, its complement or a floating "off" position.

The armatures of the first group of switches 434 connect to corresponding inputs of a NAND gate 438 and, similarly, the armatures of the second group of switches 437 to corresponding inputs of a NAND gate 439. The outputs of NAND gate 438 and 439 feed through respective inverters 441 and 442 to inputs of a final NAND gate 443, the output of which connects through an inverter 444 to the matching gate 51A via line 313 as indicated in FIG. 11.

Considering the operation of the sampler programmer 411, it is first assumed that only a portion of the scene viewed by the camera 11, e.g., a portion of the defined by the first 16 lines of the field and by the second horizontal quarter of each of those lines, is to be maintained under surveillance by the apparatus embodying the invention and that the remainder of the scene viewed is to be ignored. Assuming that all the C, D, E and F waveforms start a line at the high or positive potential half of their cycle, their values are readily determined during the second quarter of any line. During such time the value of waveform F will be positive and so the corresponding one of the switches 434 has its armature connected to the F terminal. Similarly, the value $\overline{E}$ will be positive and consequently the E—$\overline{E}$ switch has its armature switched to $\overline{E}$. During the same second quarter of each line, the values D, $\overline{D}$, C and $\overline{C}$ will oscillate between the high and low values and, in consequence, the associated switch armatures are placed in the off position. Thus, during the second quarter of each line and only during that quarter of each line, high potentials (the floating terminals acting as high rather than low potentials) will be applied by the switches 434 to all the inputs of NAND gate 438. The NAND gate output drops whereby inverter 441 places a high potential on the corresponding input of final gate 443.

Since portions of only the first 16 lines of the field are desired to be sampled, the armatures of switches 437 are set on their primary waveform terminals V, W, X, Y, Z it being assumed that the values V, W, X, Y, Z are high at the beginning of a frame. As a result, a high (logical one) input appears on each of the inputs to NAND gate 439 which causes inverter 432 to apply a logical one to the second input of final NAND gate 443 during the first 16 lines of the field. Thus, final NAND gate 443 is energized causing the final inverter 444 to apply a logical one through line 313 to the input of NAND gate 311 (FIG. 11) to enable same. As a result, sample pulses are generated by the one-shots 314 and 316 during and only during the selected second quarter of each of the first 16 lines of the field. For parts of the field outside the sample area, a logical zero is applied to line 313, and prevents sample pulses, in effect masking the part of the field not of interest.

To disable the masking circuitry of FIG. 14, the line 313 is disconnected from the NAND 311 of FIG. 11.

It will be apparent that by judicious adjustment of switches 434 and 437 that the size, shape and location of the sample area in the field may be changed at the will of the operator. Moreover, by judicious adjustment of the switches 437 more than one sample area may be provided in a field. Moreover, by coordination of the adjustment of the switching in the sample programmer 411 the density of sample points may be increased in conjunction with masking all but a sample area of the field so as to increase the resolution of the surveillance maintained in the limited sample area.

FIG. 16 illustrates an illumination detection circuit 500 for use with the above-described surveillance system. The illumination detector 500 provides an alarm of any convenient type to warn the operator that the average light level in the scene viewed has risen or fallen beyond acceptable limits or the contrast in the scene viewed has fallen outside of its desired limits. These limits may be set so that the illumination alarm will be energized before the surveillance capability of the system is degraded by unusual changes in overall light level or contrast. For example, the illumination detector 500 may be set to alarm in response to a darkening of the scene viewed sufficiently gradual as to be ignored by the averaging circuitry of FIG. 6 and due, for example, to an intruder slowly turning down the lights illuminating the scene. Similarly, the illumination detector will alarm in response to an attempt by unauthorized personnel to swamp out the surveillance system by means of a strong, controllable light source. The system will also alarm in response to a diminution in contrast below a selected level due, for example, to a gradual diffusion of smoke into the area over which surveillance is maintained.

The illumination detector 500 includes a contrast detector 501 for detecting a diminution in contrast below a desired level. The contrast detector 501 includes a brightness interpreter 504 comprising a comparator 502, fed from the $N_p$ outputs 88 through 92 of the A to D converter through conductors 503, and a reference source 506 providing a digital reference brightness level $R_B$ to the comparator 502. When the digitized light intensity value $N_p$ for a sample point exceeds the reference level $R_B$ an output is provided by the comparator 502.

The contrast detector 501 further includes a dimness interpreter 508 which comprises a comparator 509 fed from the A to D converter through conductors 511 and a reference source 512 which provides the digital reference $R_D$ to comparator 509. The comparator 509 provides an output when the illumination level $N_p$ for a point is less than the dimness reference $R_D$.

The outputs of the interpreters 504 and 508 are applied to a bright point counter 513 and a dim point counter 514, respectively. The bright point counter counts the number of sample points having a brightness $N_p$ greater than the limit $R_B$ during a given time period, in the present embodiment one frame. Similarly, the dim point counter counts the number of sample points in a frame having an illumination intensity $N_p$ less than the limit $R_D$. A reset line 516 is provided to reset the counters at the opening of each frame.

The outputs of the counters 513 and 514 are applied to interpreting circuits generally indicated at 517 and 518, respectively. Each said circuit, in the particular embodiment shown, comprises a magnitude comparator 519 fed by the associated counter. Reference generators 520 and 521 apply digitized reference values $R_{NB}$ and $R_{ND}$, respectively to the comparators 519. The comparators 519 provide outputs when the output of the associated counter is less than the corresponding one of the reference levels $R_{ND}$ and $R_{ND}$. The outputs of the comparators 519 in the interpretation circuits 517 and 518 are preferably read during the vertical retrace time at the end of the frame. The reading means here comprises a NAND gate 522 having inputs from the interpretation circuits 517 and 518 and a third input which provides an enable signal from any convenient source during the vertical retrace time at the end of each frame. The output of the NAND-gate 522 resulting from simultaneous energization of all inputs thereto is fed through an inverter 523 and one input of an OR-gate 524 for energizing an illumination alarm 526 of any convenient type.

Given a range of binary values from zero to 32 for describing the brightness $N_p$ of a sample point, the illumination reference levels $R_B$ and $R_D$ may be selected and the counters 513 and 514 will count sample points in a frame of digital brightness and dimness, respectively, over 24 and under 8. The quantity reference levels $R_{NB}$ and $R_{ND}$ are preferably relatively small, e.g., four, since a normal frame would normally have only a few very bright and very dim sample points. Thus, in this example, if there are less than four sample points of brightness greater than 24 and less than four sample points of brightness less than 8, the illumination alarm would be energized because the scene is deficient in contrast.

The illumination detector includes an extreme level detector 529 which detects excessive overall dimness or excessive overall brightness in the scene. In the particular embodiment shown, the excessive level detector 529 makes use of a video amplifier 531 disposed in the video signal path ahead of the above-described sample and hold circuit 61. The usual video output amplifier of a television camera could be used. However, in the particular embodiment shown, an amplifier 531 is disposed between the camera and the sample and hold circuit for the purpose of matching the video output amplitude of the camera to the level requirements of the succeeding circuitry. The video amplifier 531 normally includes an AGC circuit, the AGC signal being a slowly changing signal related to the video signal over several previous fields. The magnitude of the AGC voltage is therefore a measure of the average light intensity in the scene viewed taken during the previous frame.

Suitable switching, preferably electronic, is schematically indicated at 532 and is provided for breaking the normal video connection to the input of the amplifier 531 and instead connecting a line 533 to the input of amplifier 531. The line 533 is connected in any convenient manner to the amplifier AGC circuit so that the AGC signal appears on line 533. A suitable enable signal causes the switch 532 to apply the AGC voltage to the amplifier input for a relatively short period preferably during the vertical retrace time at the end of each frame whereby the output of the amplifier 531 for that period will correspond to the AGC voltage and, hence, to the average scene light intensity for the previous frame. The short duration of the enable signal avoids any possibility of instability in the camera output due to the AGC input thereto. The resulting intensity average signal on line 14 is sampled at least one time by the sample and hold circuit 61 while the switch 532 is enabled. The resulting intensity average samples are digitized by the A to D converter and passed to the circuit 529 for processing.

The circuit 529 includes a brightness interpreter 536 which proves an output whenever the intensity average exceeds a limit $R'_B$ indicating that the overall illumination level in the scene viewed is excessively high. The brightness interpreter 536 is preferably identical to the interpreter 504 described hereinabove and here includes a comparator 537 and a reference $R'_B$ generator 539. The comparator 537 provides an output through gating, here including a NAND gate 541 followed by an inverter 542 and OR-gate 524 to the illumination alarm.

The excessive level circuit 529 further includes a dimness interpreter 544 preferably similar to the interpreter 508 above described and here including a digital comparator 545 and a reference $R'_D$ generator 547. The references $R'_B$ and $R'_D$ may differ if desired from references $R_B$ and $R_D$, respectively. The dimness comparator output is applied through suitable gating, here comprising a further serial NAND gate 548 and inverter 549 and through OR-gate 524 to the illumination alarm. The enable signal applied to the switch 532 is preferably also applied to inputs of the NAND gates 541 and 548 so that the outputs of the comparators 537 and 545 are read only during the vertical retrace time at the end of the frame when the amplified AGC voltage is sampled. The same enable signal may be used for NAND gate 522.

Thus, the excessive level circuit 529 energizes the illumination alarm 526 in response to an overly bright or overly dim average illumination level in the scene.

It will be recognized in view of the foregoing that by use of presently known apparatus and techniques in association with the apparatus of the present invention, the location of a disturbance in the field can be identified and reported. By suitably identifying and reporting a series, usually consecutive, of such locations, the movement of the disturbance can be tracked.

Although particular preferred embodiments of the invention have been disclosed hereinabove, it will be understood that variations or modifications thereof lying within the scope of the appended claims are fully contemplated.

What I claim is:

1. In a method for detecting a set quantity of change in a scene while ignoring lesser changes in said scene, the steps comprising;
- scanning the scene in each of a plurality of separate time periods with a device responsive to radiation of wave energy, such as light, emanating from the scene for producing a scanning signal for each said timer period;
- sampling said scanning signal to produce a plurality of sample signals representing the instantaneous level of wave energy emanating from a plurality of corresponding, preselected points in the scene during a given one of said time periods, said points being spaced remotely from each other along the line of scan, intervening points in the scene being ignored;
- digitizing said sample signals to form digitized samples;
- establishing digital comparison standards from prior digitized samples, each said comparison standard being representative of the condition of a respective one of said spaced points during at least one of said time periods;
- comparing ones of said digitized samples produced during another time period with respective ones of said comparison standards and detecting nonzero differences therebetween;
- comparing said difference with a reference and producing a suspicion signal comprising pulses in response to preselected nonzero discrepancies between said differences and said reference;
- collecting said pulses; and
- detecting collection of a preselected quantity of said pulses and producing an output in response to detection of said preselected quantity, said output indicating the occurrence of said set quantity of change in said scene.

2. The method of claim 1 wherein an initial pulse accumulation is established prior to said detection, said accumulation increases by reason of said collecting of pulses and the accumulation is periodically subjected to reduction by a predetermined amount to avoid production of an output in response to a long series of lesser changes in the scene.

3. In a device for selectively detecting a set quantity of change in a scene while ignoring lesser changes in said scene, the combination comprising:
- means responsive to radiation of wave energy, such as light, emanating from the scene for scanning the scene in each of a sequence of time periods and for producing a plurality of sample signals during a given time period representative of the instantaneous level of wave energy emanating from a corresponding plurality of respective sample points in the scene, said sample points being spaced from each other along the line of scan across the scene, points in the scene other than said sample points being ignored;
- a further plurality of sample signals being produced for each further scanning of said sample points in corresponding further ones of said time periods;
- means for establishing comparison standards from prior sample signals, each said comparison standard being representative of the condition of a respective one of said spaced points during at least one of said time periods;
- means for comparing ones of said sample signals produced during another of said time periods with respective ones of said comparison standards and detecting nonzero differences therebetween;
- means for producing a suspicion signal comprising a pulse in response to a preselected nonzero discrepancy between one of said differences and a preselected reference;
- means for collecting said pulses; and
- means for detecting collection of a preselected number of said pulses and producing an output in response to detection of said preselected number, said output indicating the occurrence of said set quantity of change in said change in said scene.

4. The device of claim 3 wherein an accumulation of pulses is initially established and including means for changing the accumulated amount in one direction in response to said collecting of pulses and means for periodically changing accumulated amount in the opposite direction by a prescribed amount.

5. The device of claim 3 including means for digitizing said sample signals following production thereof and wherein said comparison standards, said reference signal and said suspicion signals are in digitized form.

6. The device of claim 3 wherein said means for scanning includes a plurality of units for effecting at least said scanning, each said unit being capable of scanning a separate scene, said units being arranged for time sharing at least said comparison standard establishing means, said comparing means, said suspicion signal producing means and said detecting means.

7. The device of claim 3 wherein said scene is an illuminated scene and said set quantity of change is a change in light level at at least one of said spaced points due to traversing thereof by an intruder.

8. The device of claim 3 wherein said scene is an illuminated scene and said sample signals are representative of the illumination level at the points in the scene to which said sample signals correspond, and including means responsive to a plurality of said sample signals for detecting at least one of several abnormal conditions respecting the character of the illumination of the scene, said abnormal conditions including contrast outside a preselected range, excessive brightness in the scene and excessive dimness in the scene and means responsive to said detection of said abnormal condition for producing an output.

9. The device of claim 3 wherein said means for scanning and producing sample signals includes means for scanning said scene and producing an electrical scanning signal representative of the condition of the portion of the scene along the line of scan and means for sampling said electrical signal to periodically produce ones of said sample signals; and including
- sample density selecting means adjustable for controlling the frequency of said sampling whereby to vary the spacing of points in the scene for which sample signals are produced.

10. The device of claim 3 wherein said means for scanning and producing sample signals includes means for scanning said scene and producing an electrical scanning signal representative of the condition of the portion of the scene along the line of scan and means for sampling said electrical signal to periodically produce ones of said sample signals; and including
- sample programmer means adjustable for periodically preventing sampling so that no sample signals are produced for preselected ones of said spaced points in said scene, said sample programmer means including a switching network adjustable to constrain sampling to a group of points in a portion of the scene, said portion being smaller than the scannable scene, whereby detection of changes will be limited to said portion of said scene and changes in the condition of the remainder of the scene will be ignored.

11. The device of claim 3 wherein said wave energy is visible light.

12. The device of claim 3 wherein said wave energy is electromagnetic radiation outside the visible light range.

13. In a device for detecting a set quantity of change in a scene while ignoring lesser changes, the combination comprising:

means responsive to radiation of wave energy, such as light, emanating from the scene for scanning the scene in each of a sequence of time periods and for producing a plurality of sample signals during a given time period representative of the instantaneous level of wave energy emanating from a corresponding plurality of respective sample points in the scene, said sample points being spaced from each other along the line of scan across the scene, points in the scene other than said sample points being ignored;

a further plurality of sample signals being produced for each further scanning of said sample points in corresponding further ones of said time periods;

means for digitizing said sample signals to produce digitized samples;

means for establishing comparison standards from prior samples, each comparison standard being representative of the condition of a respective one of said spaced points during at least one of said time periods, wherein said means for establishing comparison standards includes memory means for storing a digital quantity substantially corresponding to the sum of prior digitized samples for the same point produced in a preselected number of prior time periods, the most significant bits of said digital amount substantially constituting an average of said prior digitized samples and constituting said comparison standard, and memory updating means for adding said difference to the least significant bits of said digital amount stored to update said digital amount to correspond to the value of the latest digitized sample, whereby a new comparison standard is produced and stored;

means for comparing ones of said digitized samples produced during another time period with respective ones of said comparison standards and detecting nonzero differences therebetween;

means for producing a suspicion signal comprising a pulse in response to a preselected nonzero discrepancy between one of said differences and a preselected reference;

means for collecting said pulses; and means for detecting collection of a preselected quantity of said pulses and producing an output in response to detection of said preselected quantity, said output indicating the occurrence of said set quantity of change in said scene.

14. In a device for detecting a set quantity of change in a scene while ignoring lesser changes, the combination comprising:

means responsive to radiation of wave energy, such as light, emanating from the scene for scanning the scene in each of a sequence of time periods and for producing a plurality of sample signals during a given time period representative of the instantaneous level of wave energy emanating from a corresponding plurality of respective sample points in the scene, said sample points being spaced from each other along the line of scan across the scene, points in the scene other than said sample points being ignored;

a further plurality of sample signals being produced for each further scanning of said sample points in corresponding further ones of said time periods;

means for establishing comparison standards from prior sample signals, each said comparison standard being representative of the condition of a respective one of said spaced points during at least one of said time periods;

means for comparing ones of said sample signals produced during another time period with respective ones of said comparison standards and detecting nonzero differences therebetween;

means for producing a suspicion signal comprising a pulse in response to a preselected nonzero discrepancy between one of said differences and a reference;

means responsive to said comparing means for producing a further suspicion signal comprising a further pulse in response to a further preselected discrepancy between ones of said differences, said ones of said differences each corresponding to a different point in said scene, said different points being located near each other in said scene;

means for collecting said pulses; and means for detecting collection of a preselected quantity of said pulses and producing an output in response to detection of said preselected quantity, said output indicating the occurrence of a set quantity of change in said scene.

15. Apparatus for maintaining observation of a zonal domain and responsive to a significant change in said domain, comprising in combination, means capable of successively scanning said zone for producing sample signals related to the light level at spaced segments on the path of scan, means for digitizing said sample signals, means for averaging over a plurality of scans the digitized signals for each of respective ones of said segments, means for comparing said digitized signals with the corresponding one of said averages, said comparing means being responsive to differences of preselected magnitude between corresponding ones of said digitized signals and averages for producing suspicion signals, and means responsive to a preselected quantity of suspicion signals for providing an output, whereby said apparatus provides an output in response to significant changes in light levels in said zone corresponding to a change in said domain.

16. The apparatus defined in claim 15 in which said scanning means includes at least one television camera for producing a video signal corresponding in amplitude to the light level in said zone along the path scanned and sampling means responsive to said video signal for producing spaced samples of said video signal, said samples comprising said sample signals.

17. The apparatus defined in claim 16 including a high frequency clock and a first counter having a serial input from said clock and a plurality of parallel outputs pulsed at descending fractions of the clock frequency, sweep generator means responsive to the output of said first counter for scanning the beam of said television camera through a preselected scanning pattern, a second counter having a serial input from one of the fractional outputs of said first counter and having parallel outputs pulsed at diminishing fractions of the frequency of the input thereto, a matching counter connected to the parallel outputs of said first and second counters and responsive to coincidence of such counter outputs for energizing said sampling means to cause same to sample said video signal when the electron beam of said television camera is aimed at a preselected point in said zone.

18. The apparatus defined in claim 17 in which said sweep generator means comprises a horizontal sweep generator and a vertical sweep generator for controlling the path of scan of said television camera and further including alternate field generator means for reversing said second counter each time the zone is scanned whereby to allow energization of said sampling means for different sets of points in alternate scans of said zone.

19. The apparatus defined in claim 17 in which said scanning pattern comprises a plurality of successive scan lines on which said segments are located, said segments defining and being evenly spaced along spaced loci angled with respect to said scan lines, whereby an intruder moving in said zone will pass through ones of said segments changing the light intensity of at least some thereof for energizing said output means.

20. The apparatus defined in claim 15 in which said averaging means includes memory means for storing an average signal $N_{aver_0}$ corresponding to previous scans of a segment, updating means connected in circuit with the input and output of said memory means and energizable from said digitizing means by a digitized signal $N_p$ for providing an updated value $N_{aver_1}$ for updating said memory for said segment in accordance with the relation $$N_{aver_1} = \frac{N_{aver_0} \cdot (k-1) + N_p}{k}$$

wherein $k$ is the number of scans over which N is averaged.

21. The apparatus defined in claim 15 in which said averaging means includes memory means for storing digitized average signals for ones of said segments scanned, said digitized average signals each comprising a most significant part and a least significant part, said most significant part at least approximating an average of digitized sample signals for a plurality of prior scans of the corresponding segment of said zone, said comparing means including means responsive to said most significant part and to a digitized sample signal for a current scan of said corresponding segment for determining the difference between said most significant part and said digitized sample signal and further including suspicion signal generating means responsive to a difference in excess of a limit for generating a suspicion signal, said averaging means further including means for adding said difference to said least significant part of said digitized average signal for producing a new digitized average signal, means for applying said new digitized average to said memory to replace said first-mentioned average signal.

22. The apparatus defined in claim 15 including register means for registering the suspicion signals for a scanned segment, counting means responsive to occurrence of a suspicion signal for a first scanned segment for providing outputs after counting preselected numbers of subsequently scanned segments, gate means responsive to said outputs from said counting means and to further suspicion signals for energizing said register means to register still further suspicion signals, said register means being arranged to weight said still further suspicion signals more heavily than said first-mentioned suspicion signal, said further suspicion signals corresponding to at least one of segments near said first scanned segment in said zone taken in the same scan, segments near said first scanned segment in said zone taken in succeeding scans, and the same segment taken in succeeding scans.

23. The apparatus defined in claim 15 including a memory for storing said suspicion signals, means for adding suspicion signals from said comparing means to stored suspicion signals from said memory to provide a new suspicion signal and means for applying said new suspicion signal to said memory to replace said stored signals to increase the suspicion count stored in said memory in relation to changes in light level at segments of the zone scanned.

24. The apparatus defined in claim 23 including means for dispersing said suspicion signals at a predetermined rate.

25. The apparatus defined in claim 15 in which said output means includes a counter, means for resetting said counter at periodic intervals at least including a single scan of said zone, means for establishing reference levels, means responsive to suspicion signals exceeding said reference levels for actuating said counter, means for establishing a further reference level, a comparator responsive to a value in said counter exceeding said further reference for providing said output, said counter enabling said apparatus to rapidly detect changes in light intensity at numerous segments in a single scan and to quickly provide said output as a result thereof.

26. Apparatus for detecting changes in a view scene, comprising in combination, means for repetitively scanning the scene and for producing an electrical signal related in instantaneous amplitude to the intensity of radiation for the scanned portions in the scene, means for sampling said electrical signal, means for comparing a sample of said electrical signal with an average of corresponding samples for previous scans, means responsive to a deviation in excess of a predetermined value in a sample from said average for establishing a suspicion level signal, means responsive to further changes in excess of a predetermined value in further samples near said first-mentioned sample for adding to said suspicion level, comparison means responsive to a given suspicion level beyond a limit for providing an output.

27. A method of surveillance, comprising the steps, repetitively scanning a scene over which surveillance is to be maintained and producing an electrical signal related to the instantaneous light level in the portion of the scene being scanned, detecting a first set of points in the scene scanned for which the level of said electrical signals differ from the level of other such electrical signals produced in previous scans of points at least near the respective points of said first set of points, adding to a suspicion level as a function of the number of points in a second set of points, said second set comprising points of said first set at which said difference differs from preselected values, providing an output in response to a change of said suspicion level past a preset limit.

28. The apparatus defined in claim 15 including also means for producing a signal which is a function of the location of said changes spatially in said domain.

29. The apparatus defined in claim 15 including also means for producing a signal which is a function of the location of said changes spatially in said domain and for reacting to a time-spaced plurality of said signals for tracking said changes.

30. The apparatus defined in claim 15 including also means for producing a signal which is a function of the location of said changes spatially in said domain and for reacting to a consecutively appearing plurality of said signals for tracing said changes.

31. In apparatus for detecting a change in the condition of a domain, for use with means for scanning a parameter of said domain and producing a signal representative of the scanned parameters, the combination comprising:

means for sampling said signal to produce samples thereof;

means for averaging samples respectively related to selected portions of said domain to produce averages; and interpreting means for interpreting said averages and samples and including suspicion count means responsive to the relative values of corresponding samples and averages for accumulating data indicative of selected changes of said parameter at ones of said portions and producing an output signal when and only when such accumulated data attains a predetermined value.

32. The device defined in claim 31 including digitizing means following said sampling means for digitizing said samples; and in which said averaging means is interposed between said digitizing means and interpreting means for averaging, over a plurality of scans of said domain, the digitized samples for respective ones of said portions of said domain to produce said averages;

said interpreting means further includes comparison means for comparing said digitized samples with corresponding ones of said averages, said comparison means being responsive to deviations between said digitized samples and the corresponding averages; and said suspicion count means includes means responsive to ones of said deviations in excess of a predetermined value for establishing suspicion level signals, means responsive to deviations in excess of a predetermined value in further samples near said first-mentioned sample in said domain for adding to said suspicion level signals and further comparison means responsive to a suspicion level exceeding a limit for providing an alarm.